(12) United States Patent
Tooms et al.

(10) Patent No.: US 10,508,966 B2
(45) Date of Patent: Dec. 17, 2019

(54) WATER FLOW ANALYSIS

(71) Applicants: Stephen Tooms, Ashbourne Derbyshire (GB); Stuart Trow, Durham (GB)

(72) Inventors: Stephen Tooms, Ashbourne Derbyshire (GB); Stuart Trow, Durham (GB)

(73) Assignee: HOMESERVE PLC, Walsall (GB)

( * ) Notice: Subject to any disclaimer, the term of this patent is extended or adjusted under 35 U.S.C. 154(b) by 156 days.

(21) Appl. No.: 15/548,982

(22) PCT Filed: Feb. 4, 2016

(86) PCT No.: PCT/GB2016/050259
§ 371 (c)(1),
(2) Date: Aug. 4, 2017

(87) PCT Pub. No.: WO2016/124931
PCT Pub. Date: Aug. 11, 2016

(65) Prior Publication Data
US 2018/0031439 A1 Feb. 1, 2018

(30) Foreign Application Priority Data
Feb. 5, 2015 (GB) .................................. 1501935.9

(51) Int. Cl.
*G01M 3/00* (2006.01)
*G01F 1/68* (2006.01)
(Continued)

(52) U.S. Cl.
CPC ................. *G01M 3/26* (2013.01); *G01F 1/68* (2013.01)

(58) Field of Classification Search
CPC combination set(s) only.
See application file for complete search history.

(56) References Cited

U.S. PATENT DOCUMENTS 3,366,942 A 1/1968 Deane
3,425,277 A 2/1969 Adams
(Continued)

FOREIGN PATENT DOCUMENTS

CN 202693053 U 1/2013
CN 103016958 A 4/2013
(Continued)

OTHER PUBLICATIONS

Glennen, "LeakBot and HomeServe Labs fight leaky pipes", Insurance Business (https://www.insurancebusinessmag.com/uk/), Jul. 15, 2016, 3 pages.
(Continued)

*Primary Examiner* — Nguyen Q. Ha
(74) *Attorney, Agent, or Firm* — Stoel Rives LLP

(57) ABSTRACT

A location (100) is including an installation (120) associated with a site (102). At the site (102) is a house. A water main (110) forms part of a water distribution network and is buried approximately 1 m below the surface (112) of a road. A ferrule (114) extends from an upper part of the water main pipe and is in fluid communication with a first portion (116) of a service pipe at depth of typically approximately 0.75 m and which extends from the water main (110) to underneath a pavement (118). An outside stop-tap or meter chamber (122) is provided below pavement (118) and includes a pilotable cover (124), which can be opened to provide access to the interior of the chamber (122). A first connector (126) is provided on an upstream side of the chamber and a second connector (128) is provided on a downstream side of the chamber. A stop-tap or stop-tap and meter assembly (130) is provided within the chamber and in fluidic communication with the first and second connectors. An insulating member (134), for example in the form of a piece of polystyrene, extends across the interior of the chamber (122) and acts to
(Continued)

insulate the lower part of the chamber from the environment above. A temperature logging device (160) is located on the insulating member (134) and includes a first temperature sensor (162). Optionally the temperature logging device may also include a second temperature sensor (164). The temperature of a part of a water supply system between a water main (110) and the site is recorded as a function of time. The recorded temperature as a function of time is analysed to determine a property indicative of the water consumption at the site.

38 Claims, 15 Drawing Sheets

(51) Int. Cl.
G01K 13/02 (2006.01)
G01M 3/26 (2006.01)

(56) References Cited

U.S. PATENT DOCUMENTS

| | | |
|---|---|---|
| 3,438,254 A | 4/1969 | Seeley |
| 3,570,310 A | 3/1971 | Densmore |
| 3,830,104 A | 8/1974 | Gau |
| 3,938,384 A | 2/1976 | Blair |
| 4,067,237 A | 1/1978 | Arcella |
| 4,255,968 A | 3/1981 | Harpster |
| 4,295,669 A | 10/1981 | Laprade et al. |
| 4,308,746 A | 1/1982 | Covington |
| 4,319,483 A | 3/1982 | Durham, Jr. et al. |
| 4,335,605 A | 6/1982 | Boyd |
| 4,336,708 A | 6/1982 | Hobgood et al. |
| 4,339,949 A | 7/1982 | Bahner et al. |
| 4,400,975 A | 8/1983 | McGarr |
| 4,418,568 A | 12/1983 | Surman |
| 4,440,021 A | 4/1984 | Abouchar et al. |
| 4,480,467 A | 11/1984 | Harter et al. |
| 4,484,471 A | 11/1984 | Swithenbank et al. |
| 4,494,112 A | 1/1985 | Streib |
| 4,495,488 A | 1/1985 | Streib |
| 4,519,246 A | 5/1985 | Hartemink |
| 4,548,516 A | 10/1985 | Helenowski |
| 4,599,895 A | 7/1986 | Wiseman |
| 4,609,292 A | 9/1986 | Asano |
| 4,633,578 A | 1/1987 | Aine et al. |
| 4,637,253 A | 1/1987 | Sekimura et al. |
| 4,690,570 A | 9/1987 | Wall |
| 4,750,189 A | 6/1988 | Lancaster et al. |
| 4,843,881 A | 7/1989 | Hubbard |
| 4,876,887 A | 10/1989 | Mickler |
| 4,922,233 A | 5/1990 | Twerdochlib |
| 4,938,079 A | 7/1990 | Goldberg |
| 4,942,763 A | 7/1990 | Harpster |
| 4,984,460 A | 1/1991 | Isoda |
| 5,020,919 A | 7/1991 | Suomi |
| 5,056,047 A | 10/1991 | Sondergeld |
| 5,064,604 A | 11/1991 | Barton |
| 5,067,094 A | 11/1991 | Hayes |
| 5,078,006 A | 1/1992 | Maresca, Jr. et al. |
| 5,161,410 A | 11/1992 | Davey et al. |
| 5,189,904 A | 3/1993 | Maresca, Jr. |
| 5,191,793 A | 3/1993 | Drexel et al. |
| 5,201,212 A | 4/1993 | Williams |
| 5,226,333 A | 7/1993 | Hess |
| 5,228,329 A | 7/1993 | Dennison |
| 5,233,868 A | 8/1993 | Coats et al. |
| 5,259,243 A | 11/1993 | Drexel et al. |
| 5,285,673 A | 2/1994 | Drexel et al. |
| 5,287,876 A | 2/1994 | Takahashi |
| 5,299,594 A | 4/1994 | Lord et al. |
| 5,316,035 A | 5/1994 | Collins et al. |
| 5,335,555 A | 8/1994 | Guizot et al. |
| 5,343,737 A | 9/1994 | Baumoel |
| 5,347,861 A | 9/1994 | Satoh |
| 5,402,111 A | 3/1995 | Hubbard, Jr. |
| 5,410,912 A | 5/1995 | Suzuki |
| 5,415,033 A | 5/1995 | Maresca, Jr. et al. |
| 5,417,110 A | 5/1995 | Wood |
| 5,437,180 A | 8/1995 | Sowinski |
| 5,453,944 A | 9/1995 | Baumoel |
| 5,461,910 A | 10/1995 | Hodson et al. |
| 5,515,295 A | 5/1996 | Wang |
| 5,525,040 A | 6/1996 | Andreae et al. |
| 5,610,323 A | 3/1997 | Ashworth |
| 5,676,132 A | 10/1997 | Tillotson et al. |
| 5,685,194 A | 11/1997 | McCulloch et al. |
| 5,741,968 A | 4/1998 | Arai |
| 5,750,893 A | 5/1998 | Murata et al. |
| 5,763,774 A | 6/1998 | Ha et al. |
| 5,764,539 A | 6/1998 | Rani |
| 5,869,758 A | 2/1999 | Huiberts |
| 5,918,268 A | 6/1999 | Lukas et al. |
| 5,936,156 A | 8/1999 | Roberts et al. |
| 5,948,969 A | 9/1999 | Fierro et al. |
| 6,023,969 A | 2/2000 | Feller |
| 6,047,250 A | 4/2000 | Beaudoin et al. |
| 6,085,588 A | 7/2000 | Khadkikar et al. |
| 6,098,455 A | 8/2000 | Nukui et al. |
| 6,101,451 A | 8/2000 | Smith et al. |
| 6,105,607 A | 8/2000 | Caise et al. |
| 6,125,695 A | 10/2000 | Alvesteffer et al. |
| 6,217,211 B1 | 4/2001 | Hesky |
| 6,234,152 B1 | 5/2001 | Fritz et al. |
| 6,240,775 B1 | 6/2001 | Uramachi et al. |
| 6,348,869 B1 | 2/2002 | Ashworth |
| 6,354,150 B1 | 3/2002 | Rudent et al. |
| 6,411,192 B1 | 6/2002 | Landis |
| 6,430,944 B1 | 8/2002 | Ozawa |
| 6,437,692 B1 | 8/2002 | Petite et al. |
| 6,474,155 B1 | 11/2002 | Berkcan et al. |
| 6,487,904 B1 | 12/2002 | Myhre |
| 6,508,235 B2 | 1/2003 | Fabre |
| 6,547,435 B1 | 4/2003 | Grosswig et al. |
| 6,588,268 B1 | 7/2003 | Yamagishi et al. |
| 6,626,037 B1 | 9/2003 | Wado et al. |
| 6,647,777 B1 | 11/2003 | Kotaka et al. |
| 6,658,931 B1 | 12/2003 | Plumb et al. |
| 6,672,154 B1 | 1/2004 | Yamagishi et al. |
| 6,681,582 B2 | 1/2004 | Suzuki et al. |
| 6,681,625 B1 | 1/2004 | Berkcan et al. |
| 6,779,919 B1 | 8/2004 | Staniforth et al. |
| 6,834,556 B2 | 12/2004 | Cain et al. |
| 6,837,271 B1 | 1/2005 | Saint |
| 6,866,089 B2 | 3/2005 | Avila |
| 6,883,369 B1 | 4/2005 | Myhre |
| 6,891,838 B1 | 5/2005 | Petite et al. |
| 6,914,893 B2 | 7/2005 | Petite |
| 7,031,851 B2 | 4/2006 | Sherikar |
| 7,053,767 B2 | 5/2006 | Petite et al. |
| 7,076,373 B1 | 7/2006 | Munsterhuis et al. |
| 7,084,778 B2 | 8/2006 | Shoub |
| 7,103,511 B2 | 9/2006 | Petite |
| 7,308,824 B2 | 12/2007 | Trescott, Jr. et al. |
| 7,358,860 B2 | 4/2008 | Germouni et al. |
| 7,468,661 B2 | 12/2008 | Petite et al. |
| 7,490,625 B1 | 2/2009 | Johnson et al. |
| 7,623,028 B2 | 11/2009 | Kates |
| 7,697,492 B2 | 4/2010 | Petite |
| 7,711,500 B1 | 5/2010 | Killion et al. |
| 8,188,359 B2 | 5/2012 | Chakraborty |
| 8,290,721 B2 | 10/2012 | Wehrs et al. |
| 8,413,615 B2 | 4/2013 | Tsuge |
| 8,643,716 B1 | 2/2014 | Kalokitis et al. |
| 8,912,530 B2 | 12/2014 | Yang et al. |
| 8,935,106 B2 | 1/2015 | Balogh et al. |
| 8,935,110 B2 | 1/2015 | Hsieh et al. |
| 9,146,172 B2 | 9/2015 | Trescott |
| 9,212,966 B2 | 12/2015 | Scheucher |
| 10,185,543 B2 | 1/2019 | Vilermo et al. |
| 2001/0027684 A1 | 10/2001 | Lotters |
| 2001/0032503 A1 | 10/2001 | Schrittenlacher |
| 2001/0052261 A1 | 12/2001 | Lull et al. |

(56) References Cited

U.S. PATENT DOCUMENTS

| | | |
|---|---|---|
| 2002/0130780 A1 | 9/2002 | McQueen et al. |
| 2002/0147425 A1 | 10/2002 | Briggs et al. |
| 2003/0048190 A1 | 3/2003 | Landis |
| 2003/0079553 A1 | 5/2003 | Cain et al. |
| 2003/0115952 A1 | 6/2003 | Mayer et al. |
| 2003/0196487 A1 | 10/2003 | Ariyoshi |
| 2003/0221483 A1 | 12/2003 | McMillan et al. |
| 2004/0025585 A1 | 2/2004 | Seki et al. |
| 2004/0031331 A1 | 2/2004 | Blakley et al. |
| 2004/0045352 A1 | 3/2004 | Kamiunten et al. |
| 2004/0064270 A1 | 4/2004 | Luchner |
| 2004/0139799 A1 | 7/2004 | Sudolcan et al. |
| 2004/0149027 A1 | 8/2004 | Gimson |
| 2004/0194544 A1 | 10/2004 | Tokuhisa et al. |
| 2004/0225458 A1 | 11/2004 | Sherikar |
| 2004/0255667 A1 | 12/2004 | Konzelmann et al. |
| 2005/0005683 A1 | 1/2005 | Wolford et al. |
| 2005/0072225 A1 | 4/2005 | Kanke et al. |
| 2005/0081620 A1 | 4/2005 | Ito et al. |
| 2005/0155421 A1 | 7/2005 | Koike et al. |
| 2005/0155663 A1 | 7/2005 | Dhellemmes et al. |
| 2005/0188776 A1 | 9/2005 | Kunter et al. |
| 2005/0193802 A1 | 9/2005 | Tipler |
| 2005/0222782 A1 | 10/2005 | Kottenstette et al. |
| 2005/0223793 A1 | 10/2005 | Markus |
| 2005/0229714 A1 | 10/2005 | Willigen |
| 2006/0010973 A1 | 1/2006 | Brown |
| 2006/0027267 A1 | 2/2006 | Fritze |
| 2006/0108003 A1 | 5/2006 | Bradford et al. |
| 2006/0161311 A1 | 7/2006 | Vinson et al. |
| 2006/0161357 A1 | 7/2006 | Munsterhuis et al. |
| 2006/0162442 A1 | 7/2006 | Matsumoto et al. |
| 2006/0207320 A1 | 9/2006 | Yamada et al. |
| 2006/0213263 A1 | 9/2006 | Kawanishi et al. |
| 2006/0025507 A1 | 10/2006 | Paulson |
| 2006/0225507 A1 | 10/2006 | Paulson |
| 2006/0230826 A1 | 10/2006 | Nakamura et al. |
| 2006/0234414 A1 | 10/2006 | Van Der Wiel |
| 2006/0272830 A1 | 12/2006 | Firma |
| 2006/0283236 A1 | 12/2006 | Trescott, Jr. et al. |
| 2007/0039662 A1 | 2/2007 | Shuey |
| 2007/0047616 A1 | 3/2007 | Izumiura et al. |
| 2007/0137297 A1 | 6/2007 | Gehman et al. |
| 2007/0160108 A1 | 7/2007 | Kent |
| 2007/0174016 A1 | 7/2007 | Ding et al. |
| 2007/0181554 A1 | 8/2007 | Nakano et al. |
| 2007/0219650 A1 | 9/2007 | Wang et al. |
| 2007/0290134 A1 | 12/2007 | Key et al. |
| 2007/0295081 A1 | 12/2007 | Orban et al. |
| 2008/0008223 A1 | 1/2008 | Guillet |
| 2008/0013291 A1 | 1/2008 | Bork |
| 2008/0016958 A1 | 1/2008 | Matsumoto et al. |
| 2008/0023196 A1 | 1/2008 | Crawley et al. |
| 2008/0034861 A1 | 2/2008 | Bognor |
| 2008/0047339 A1 | 2/2008 | Hasebe |
| 2008/0092644 A1 | 4/2008 | Hasebe |
| 2008/0115565 A1 | 5/2008 | Yanagi et al. |
| 2008/0121022 A1 | 5/2008 | Koike et al. |
| 2008/0133152 A1 | 6/2008 | Nitschke et al. |
| 2008/0168783 A1 | 7/2008 | Kojima et al. |
| 2008/0210002 A1 | 9/2008 | Kamiunten et al. |
| 2008/0282791 A1 | 11/2008 | Nakano et al. |
| 2008/0289410 A1 | 11/2008 | Pape et al. |
| 2008/0289411 A1 | 11/2008 | Schrag et al. |
| 2008/0289412 A1 | 11/2008 | Huck |
| 2008/0295590 A1 | 12/2008 | Sukegawa et al. |
| 2008/0307879 A1 | 12/2008 | Borst et al. |
| 2009/0000372 A1 | 1/2009 | Matsumoto et al. |
| 2009/0007968 A1 | 1/2009 | Knecht et al. |
| 2009/0025473 A1 | 1/2009 | Imai et al. |
| 2009/0071625 A1 | 3/2009 | Lyon |
| 2009/0094999 A1 | 4/2009 | Leatherbarrow |
| 2009/0116535 A1 | 5/2009 | Rund |
| 2009/0120206 A1 | 5/2009 | Matsubara |
| 2009/0201969 A1 | 8/2009 | Krauss et al. |
| 2009/0234513 A1 | 9/2009 | Wiggins |
| 2009/0308140 A1 | 12/2009 | Haseloh et al. |
| 2010/0037688 A1 | 2/2010 | Inoue et al. |
| 2010/0045951 A1 | 2/2010 | Martens et al. |
| 2010/0089118 A1 | 4/2010 | Mayer et al. |
| 2010/0089459 A1 | 4/2010 | Smirnov et al. |
| 2010/0110437 A1 | 5/2010 | Furtaw et al. |
| 2010/0139390 A1 | 6/2010 | Gimson et al. |
| 2010/0147068 A1 | 6/2010 | Neuhaus et al. |
| 2010/0206090 A1 | 8/2010 | Stack |
| 2010/0223991 A1 | 9/2010 | Muraoka et al. |
| 2010/0265096 A1 | 10/2010 | Cornwall et al. |
| 2010/0280769 A1 | 11/2010 | Levy |
| 2011/0025511 A1 | 2/2011 | Wien |
| 2011/0061841 A1 | 3/2011 | Zolock et al. |
| 2011/0098944 A1 | 4/2011 | Pfau et al. |
| 2011/0100114 A1 | 5/2011 | de Corral |
| 2011/0178736 A1 | 7/2011 | Westra et al. |
| 2011/0209526 A1 | 9/2011 | Wagner |
| 2011/0295540 A1 | 12/2011 | Makinen |
| 2011/0296910 A1 | 12/2011 | Lopez et al. |
| 2011/0301848 A1 | 12/2011 | Garcia et al. |
| 2011/0308300 A1 | 12/2011 | Bandaru et al. |
| 2012/0067542 A1 | 3/2012 | Frach et al. |
| 2012/0097253 A1 | 4/2012 | Eutsler |
| 2012/0180877 A1 | 7/2012 | Pallais |
| 2012/0191381 A1 | 7/2012 | Takakura et al. |
| 2012/0192642 A1 | 8/2012 | Speldrich et al. |
| 2012/0192644 A1 | 8/2012 | Asano et al. |
| 2012/0206272 A1 | 8/2012 | Borlee |
| 2012/0232809 A1 | 9/2012 | Steckling |
| 2012/0245884 A1 | 9/2012 | Wohrle |
| 2012/0279316 A1 | 11/2012 | Gaarder |
| 2012/0304746 A1 | 12/2012 | Gerhardt |
| 2012/0324985 A1 | 12/2012 | Gu et al. |
| 2012/0329166 A1 | 12/2012 | Skarping et al. |
| 2013/0014577 A1 | 1/2013 | Tam et al. |
| 2013/0031973 A1 | 2/2013 | Kirst et al. |
| 2013/0041234 A1 | 2/2013 | Grinstein et al. |
| 2013/0041588 A1 | 2/2013 | Johnson et al. |
| 2013/0066568 A1 | 3/2013 | Alonso |
| 2013/0081449 A1 | 4/2013 | Li et al. |
| 2013/0085688 A1 | 4/2013 | Miller et al. |
| 2013/0098150 A1 | 4/2013 | Sella |
| 2013/0106616 A1 | 5/2013 | Gustafsson et al. |
| 2013/0174649 A1 | 7/2013 | Hains et al. |
| 2013/0276549 A1 | 10/2013 | Gaarder |
| 2014/0034145 A1 | 2/2014 | Burt |
| 2014/0046605 A1 | 2/2014 | McHugh et al. |
| 2014/0049008 A1 | 2/2014 | Ziegler |
| 2014/0109882 A1 | 4/2014 | Hoegl et al. |
| 2014/0260549 A1 | 9/2014 | Dudar et al. |
| 2014/0261693 A1 | 9/2014 | Geerligs et al. |
| 2014/0290335 A1 | 10/2014 | Shanks |
| 2014/0290355 A1 | 10/2014 | Booten et al. |
| 2014/0298919 A1 | 10/2014 | Milley et al. |
| 2014/0306828 A1 | 10/2014 | Trescott et al. |
| 2014/0348205 A1 | 11/2014 | Shaw et al. |
| 2014/0360262 A1 | 12/2014 | Asano et al. |
| 2014/0376594 A1 | 12/2014 | Daily et al. |
| 2015/0006092 A1 | 1/2015 | Grohmann |
| 2015/0020587 A1 | 1/2015 | Milley et al. |
| 2015/0027221 A1 | 1/2015 | Aizawa et al. |
| 2015/0120133 A1 | 4/2015 | Dudar et al. |
| 2015/0122009 A1 | 5/2015 | Berkcan et al. |
| 2015/0134277 A1 | 5/2015 | Van Doorn |
| 2015/0153208 A1 | 6/2015 | Arnold et al. |
| 2015/0192442 A1 | 7/2015 | Olin |
| 2015/0219522 A1 | 8/2015 | Tseng et al. |
| 2015/0268264 A1 | 9/2015 | Nelson |
| 2015/0300856 A1 | 10/2015 | Pfau et al. |
| 2015/0300908 A1 | 10/2015 | Laramee et al. |
| 2015/0316401 A1 | 11/2015 | Popp et al. |
| 2015/0337679 A1 | 11/2015 | Everwyn et al. |
| 2015/0376874 A1 | 12/2015 | Breedlove |
| 2016/0011031 A1 | 1/2016 | Asano et al. |
| 2016/0025536 A1 | 1/2016 | Madsen |
| 2016/0084693 A1 | 3/2016 | Lang et al. |
| 2016/0138988 A1 | 5/2016 | Hansmann |

(56) References Cited

U.S. PATENT DOCUMENTS

| | | |
|---|---|---|
| 2016/0161940 A1 | 6/2016 | Max |
| 2016/0163177 A1 | 6/2016 | Klicpera |
| 2016/0187175 A1 | 6/2016 | Suzuki et al. |
| 2016/0245681 A1 | 8/2016 | Maginnis et al. |
| 2016/0265685 A1 | 9/2016 | Hassell et al. |
| 2016/0265955 A1 | 9/2016 | Easey et al. |
| 2016/0320245 A1 | 11/2016 | Herbron |
| 2016/0334045 A1 | 11/2016 | Smyth et al. |
| 2017/0247863 A1 | 8/2017 | Kobayashi et al. |
| 2017/0356774 A1 | 12/2017 | Gaberthuel |
| 2018/0010978 A1 | 1/2018 | Bailey |
| 2018/0038722 A1 | 2/2018 | Ozaki et al. |
| 2018/0058891 A1 | 3/2018 | Easey et al. |
| 2018/0238747 A1 | 8/2018 | Choi et al. |
| 2018/0291911 A1 | 10/2018 | Ward et al. |
| 2018/0313714 A1 * | 11/2018 | Bailey ............... G01M 3/002 |
| 2019/0128762 A1 | 5/2019 | Bailey et al. |

FOREIGN PATENT DOCUMENTS

| | | |
|---|---|---|
| DE | 3827444 A1 | 2/1990 |
| DE | 19858307 A | 6/2000 |
| DE | 19921256 A | 11/2000 |
| DE | 10017958 A1 | 12/2000 |
| DE | 102004061261 A | 6/2006 |
| DE | 102007037394 A1 | 2/2009 |
| DE | 102012022991 A1 | 5/2014 |
| DE | 102013006874 A | 10/2014 |
| DE | 202014100330 U1 | 5/2015 |
| DE | 102014114848 A1 | 4/2016 |
| EP | 0989396 A | 3/2000 |
| EP | 1006500 A2 | 6/2000 |
| EP | 1247082 A | 10/2002 |
| EP | 1247082 A2 | 10/2002 |
| EP | 1431717 A1 | 6/2004 |
| EP | 2000784 A1 | 12/2008 |
| EP | 2000788 A1 | 12/2008 |
| EP | 1643230 B | 4/2010 |
| EP | 2253897 A1 | 11/2010 |
| EP | 2126531 B1 | 9/2011 |
| EP | 2518465 A2 | 10/2012 |
| EP | 2682719 A1 | 1/2014 |
| EP | 2840362 A1 | 2/2015 |
| EP | 3067671 A1 | 9/2016 |
| EP | 3268702 A1 | 1/2018 |
| ES | 2354673 A | 3/2011 |
| FR | 2318410 A1 | 2/1977 |
| FR | 2763665 A1 | 11/1998 |
| GB | 1246670 A | 9/1971 |
| GB | 1504334 | 3/1978 |
| GB | 1517740 A | 7/1978 |
| GB | 2289760 A | 10/1997 |
| GB | 2452043 A | 2/2009 |
| GB | 2475257 A | 5/2011 |
| GB | 2516770 A | 2/2015 |
| GB | 2533936 A | 7/2016 |
| GB | 2536364 A | 9/2016 |
| GB | 2537013 A | 10/2016 |
| GB | 2545830 A | 6/2017 |
| GB | 2546018 A | 7/2017 |
| GB | 2546126 | 7/2017 |
| GB | 2549209 A | 10/2017 |
| GB | 2559737 A | 8/2018 |
| GB | 2559836 A | 8/2018 |
| GB | 2562695 A | 11/2018 |
| IL | 47511 A | 7/1977 |
| IN | 201717036197 A | 8/2007 |
| JP | 5679230 A | 6/1981 |
| JP | S57198840 | 12/1982 |
| JP | 58086417 A * | 5/1983 ............... G01F 1/68 |
| JP | 361026829 | 2/1986 |
| JP | 61195326 A | 8/1986 |
| JP | S6119532 A | 8/1986 |
| JP | H0854268 A | 2/1996 |
| JP | 2001091369 A | 4/2001 |
| JP | 2018036101 | 3/2018 |
| RU | 2232379 C2 | 7/2004 |
| WO | 9626425 A1 | 8/1996 |
| WO | 9726520 A1 | 7/1997 |
| WO | 9808069 A1 | 2/1998 |
| WO | 0125743 A2 | 4/2001 |
| WO | 0198736 A1 | 12/2001 |
| WO | 03029759 A1 | 4/2003 |
| WO | 03052356 A1 | 6/2003 |
| WO | 2004020958 A1 | 3/2004 |
| WO | 2004025241 A1 | 3/2004 |
| WO | 2004063679 A1 | 7/2004 |
| WO | 2005047828 A1 | 5/2005 |
| WO | 2006058863 A1 | 8/2006 |
| WO | 2007063110 A1 | 6/2007 |
| WO | 2009024746 A2 | 2/2009 |
| WO | 2010103521 A2 | 9/2010 |
| WO | 2010114408 A1 | 10/2010 |
| WO | 2010139914 A1 | 12/2010 |
| WO | 2010142999 A2 | 12/2010 |
| WO | 2011107101 A1 | 9/2011 |
| WO | 2012033908 A1 | 3/2012 |
| WO | 2012035483 A2 | 3/2012 |
| WO | 2012097407 A2 | 7/2012 |
| WO | 2013110603 A1 | 8/2013 |
| WO | 2014173414 A1 | 10/2014 |
| WO | 2014194982 A2 | 12/2014 |
| WO | 2014203246 A2 | 12/2014 |
| WO | 2015019081 A1 | 2/2015 |
| WO | 2015028629 A1 | 3/2015 |
| WO | 2015039664 | 3/2015 |
| WO | 2015093941 A1 | 6/2015 |
| WO | 2015097407 A1 | 7/2015 |
| WO | 2015119139 A1 | 8/2015 |
| WO | 2015166265 A1 | 11/2015 |
| WO | 2015166429 A1 | 11/2015 |
| WO | 2015171196 A1 | 11/2015 |
| WO | 2015178904 A1 | 11/2015 |
| WO | 2015192857 A1 | 12/2015 |
| WO | 2016044866 A4 | 3/2016 |
| WO | 2016096498 A1 | 6/2016 |
| WO | 2016102124 A1 | 6/2016 |
| WO | 2016110696 A1 | 7/2016 |
| WO | 2016124931 A1 | 8/2016 |
| WO | 2016140019 A1 | 9/2016 |
| WO | 2016146500 A1 | 9/2016 |
| WO | 2017045819 A1 | 3/2017 |
| WO | 2017118834 A1 | 7/2017 |
| WO | 2016067558 A1 | 9/2017 |
| WO | 2015000487 A1 | 1/2018 |
| WO | 2018007802 A1 | 1/2018 |
| WO | 2018010746 | 1/2018 |

OTHER PUBLICATIONS

Neptune Oceanographics, "Temperature Detection", http://www.neptuneoceanographics.com/thermal-leak-detection.php, Dec. 14, 2015, 2 pages.

Panasonic, "Leak Detection and Automatic Refrigerant Pump Down", www.aircon.panasonic.eu, 5 pages.

* cited by examiner

WATER FLOW ANALYSIS

TECHNICAL FIELD

The present invention relates to liquid flow analysis and in particular to methods, devices, apparatus and systems that can be used to understand water flow within a site.

BACKGROUND

There are a number of utilities commonly provided to domestic and commercial sites. Such utilities can include gas, electricity and water. Metering can be used at each site in order to determine the amount of the utility being consumer by the site. While individual electricity and gas meters are reasonably common for many sites, individual water meters are not as common. The leakage or escape of gas from the supply system or appliances within a site is detectable owing to the smell. Electricity is not a fluid and therefore does not in principle leak or escape.

Much water leakage is not easy to discover or detect as much of the water supply system is buried underground. Some leakage or escape of water is obviously detectable including leaks where the effect of the leak is visible above ground and/or where it affects a customer's supply. These leaks are commonly referred to as 'Reported' leaks. Other hidden leaks, commonly referred to as 'Unreported' leaks can be detected using acoustic techniques. However, 'Reported' and 'Unreported' 'known' leaks from water supply systems may account for possibly less than half of the water lost from a water supply system. The remainder, commonly referred to as 'Background' leakage is not obvious and is not detectable using currently available techniques.

Some of the leakage may simply be leaks from the water supply system which do not give rise to any visible effect or which are too small to be reliably detected by acoustic techniques. Some flow of water that the water utility considers to be leakage using current analytical and measurement techniques, may in fact be due to flows into storage cisterns and tanks which is subsequently used or consumed. Even if a leak could in principle be discovered using an acoustic technique, this may not be practicable or economic in reality owing to the size of the water supply system and the need to carry out an exhaustive search. Also, fresh leaks may occur at any time.

Hence, it would be beneficial to be able more easily to identify likely locations where water is being lost or wasted by methods other than acoustics.

SUMMARY

The present invention is based on measuring the temperature as a function of time of a part of the water supply system for one or more sites to determine the likely water consumption of a site. Hence, whether the site is unintentionally using water and wasting water drawn from the main water supply system can be determined. Other properties of the water consumption by the site can also be determined.

A first aspect of the invention provides a method of determining water consumption at a site, comprising: recording the temperature of a part of a water supply system between a water main and a site as a function of time; and analysing the recorded temperature as a function of time to determine a property, or a plurality of properties, indicative of the water consumption at the site.

The or each property may be directly or indirectly indicative of the water consumption at the site. For example, a directly indicative property may be an estimate or calculation of the water flow rate through the part of the water supply system. For example, an indirectly indicative property may be one or more quantities or metrics derived from the recorded temperature by the analysing and which in some way characterise the water consumption by the site.

The or each property may be an absolute value, e.g. a temperature, or a relative value, e.g. a first temperature compared with another temperature. The or each property may be some form of statistical measure, for example a mean, standard deviation or the like. The or each property may be the result of a pattern-matching procedure. The pattern matching procedure may include matching a known shape of a time series of peaks or troughs in temperature to the recorded temperature as a function of time to identify the time and amplitude of peaks or troughs.

The or each property may indicate whether the water consumption at the site is anomalous. Various types of anomalous water consumption which deviate from the usual or typical water consumption for similar sites may be identified, for example water consumption patterns, water consumption times, water consumption amounts, continuous water consumption, frequency of water consumption, and similar.

The property may be indicative of a continuous flow of water at the site.

The property may be an estimate of the rate of flow of water at the site.

The method may further comprise using the property to classify or identify a state or status of the site. The state or status may be likely having a water leak or not having a water leak. The property may additionally or alternatively be used to classify or identify the state or status of the flow of water of the site. A plurality of different states may be provided, for example low, intermediate and high. The state of the site may later be used to prioritise any remedial work or activity for the site, such as scheduling a repair visit.

The or each property may be associated with, or be a property of, one or more peaks or troughs in the recorded temperature. For example, the property may relate to the height (absolute or relative) and/or the width (absolute or relative) and/or the shape and/or a statistical property of any of the preceding, of one or more peaks or one or more troughs in the recorded temperature.

The or each property may be associated with, or be a property of, the recorded temperature between any peaks or troughs in the recorded temperature. For example, the property may relate to the value of (absolute or relative) and/or the variation in (absolute or relative) and/or the shape of and/or a statistical property of any of the preceding, of the recorded temperature between any peaks or troughs in the recorded temperature.

The method may further comprise analysing the recorded temperature as a function of time to determine a plurality of properties indicative of the water consumption at the site.

A first property, or first group of properties, may be associated with, or be of, one or more peaks or troughs in the recorded temperature and/or a second property, or second group of properties, may be associated with, or be of, the recorded temperature between any peaks or troughs in the recorded temperature.

The method may further comprise recording the temperature of respective parts of the water supply system between a water main and a plurality of sites as a function of time and wherein the site is a one of the plurality of sites.

The method may further comprise analysing the recorded temperature as a function of time for a one, a plurality or each of the others of the plurality of sites, not including the site, to determine a further property for a one, a plurality or each of the others of the plurality of sites.

The method may further comprise using the property of the site and the further property of one or more of the other sites to classify the site as likely having a water leak or not having a water leak.

The property may be individual water use events corresponding to individual water use events at the site.

Analysing the recorded temperature as a function of time may include determining a rate of change of the recorded temperature or a normalised value of the recorded temperature.

Analysing the recorded temperature as a function of time may include identifying peaks in the rate of change to identify individual water use events. Identifying peaks in the rate of change may include identifying a start of a peak and an end of a peak. The start of a peak may be determined by a first threshold and/or a first change in value. The end of a peak may be determined by a second threshold and/or a second change in value. The second threshold may be less than the first threshold Analysing the recorded temperature as a function of time may include making an initial determination of the total number of water use events during a period of time. The initial determination of the total number of water use events may be adjusted to arrive at a final total number of water use events. The adjustment may be based on the duration of the water use events as a proportion of the period of time.

Analysing the recorded temperature as a function of time may include calculating the average flow rate for each individual water use event.

Analysing the recorded temperature as a function of time may include filtering the recorded temperature data or normalised recorded temperature data to remove higher frequency and/or lower frequency components unlikely to correspond to individual water use events.

The or each part of the water supply system may be located in or at the site.

The or each part of the water supply system may be located in an external chamber. Preferably, the external chamber is on public land or property, such as a pavement, road, path or walkway.

The or each part of the water supply system may be located within a building. The building may be a domestic dwelling. The or each part of the water supply system may be or include an internal stop-tap.

The or each part may be a valve or a pipe, or a part of a pipe, in thermal communication with a valve. The valve may be a stop-tap or a part of a stop-tap and water meter assembly or similar. The part may be a handle or a body of the stop-tap.

The method may further comprise recording the temperature of an environment in thermal communication with the part of a water supply system between a water main and a site as a function of time.

The method may further comprise analysing the recorded temperature of the environment as a function of time to determine a property of the environment.

The method may further comprise also using the property of the environment to classify the site and/or to determine the property, or plurality of properties, indicative of the water consumption at the site.

The environment may be the ground or the air or the space adjacent the part of the water supply system. The environment may be within or part of a chamber within which the part of the water supply system is located. The property of the environment may be the temperature of the environment.

The temperature of the part of the water supply system may be recorded for at least ten minutes, preferably more than six hours, preferably at least twelve hours and most preferably at least 48 hours The temperature of the part of the water supply system may be recorded for between one and seven days. Preferably the temperature is recorded for approximately two days.

The or each site may be, or may include, a domestic dwelling or dwellings. The domestic dwelling may be a house, flats or apartments. The house may be terraced, semi-detached or detached.

The or each site may be, or include, a commercial premises. The commercial premises may be, or include, one or more of a shop, a factory, a workshop, an office or similar.

The method may further comprise transmitting the recorded temperature as a function of time to a computer and wherein the computer carries out the analysis.

The recorded temperature may be wirelessly transmitted to the computer.

The method may further comprise wirelessly transmitting a message including one or more results of the analysis to a remote computer. The message may be transmitted over a communications network.

A further aspect of the invention provides apparatus comprising: a temperature logger including a temperature sensor and a memory configured to record temperature as a function of time; and a data processing device configured to analyse the recorded temperature as function of time to determine a property indicative of water consumption.

The temperature sensor may be adapted to be releasable attachable to a part of a water supply system provided between a water main and a site. The temperature sensor may include, or be attached to, or be provided as part of, a releasable fastener, such as a clip or clamp or similar.

The temperature logger and the data processing device may be provided as parts of the same temperature logging device.

The apparatus may further comprise wireless telecommunications circuitry.

The temperature logger and data processing device may be provided as separate devices. The temperature logger may be configured to transfer the recorded temperature as a function of time to the data processing device.

The temperature logger may further include a further temperature sensor and wherein the memory is further configured to record a further temperature as a function of time. The data processing device may be further configured to analyse the recorded further temperature as function of time to determine a further property.

The data processing device may be further configured to carry out one or more of any of the features of the preceding method aspect of the invention.

A further aspect of the invention provides a data processing method of determining water consumption at a site, comprising: analysing data representing the recorded temperature of a part of a water supply system between a water main and a site as a function of time to determine a property, or a plurality of properties, indicative of the water consumption at the site.

Any of the preferred data processing features of the preceding aspects of the invention may also be preferred features of the data processing method aspect of the invention.

A further aspect of the invention provides a data processing apparatus configured to carry out the data processing method aspect of the invention. The data processing apparatus may include at least one data processor and a memory storing computer program code extractable by the data processor to carry out the data processing method.

A further aspect of the invention provides an installation comprising: a temperature logging device including a temperature sensor; and a part of a water supply system between a water main and a site, and wherein the temperature sensor is in thermal communication with the part of the water supply system and the temperature logging device is configured to record the temperature of the part of the water supply system as a function of time.

The part of the water supply system may be within an external stop-tap and/or water meter chamber and the temperature logging device may be located within the external stop tap and/or water meter chamber. The chamber may be on public or non-private land, property or premises.

The part of the water supply system may be an external stop-tap or an external stop-tap and water meter assembly.

The part of the water supply system may be within a building and the temperature logging device may be located within the building.

The part of the water supply system may be an internal stop-tap or an internal stop-tap and water meter assembly.

The temperature logging device may include a further temperature sensor. The further temperature sensor may be in thermal communication with an environment of the part of the water supply system. The temperature logging device may be further configured to record the temperature of the environment of the part of the water supply system as a function of time.

A further aspect of the invention provides a water consumption surveying method comprising: installing respective temperature logging devices to log measured temperature of respective parts of a water supply system between a water main and respective sites for each of a plurality of sites; recording the temperature as a function of time of the respective parts of the water supply system using the temperature logging devices; and analysing the recorded temperature as a function of time for the plurality of sites to determine whether any of the plurality of sites is likely to have an anomalous water consumption. The source of the anomalous water consumption may be one or more water leaks.

A further aspect of the invention provides a water consumption surveying method comprising: installing respective temperature logging devices to log measured temperature of respective parts of a water supply system between a water main and respective sites for each of a plurality of sites; recording the temperature as a function of time of the respective parts of the water supply system using the temperature logging devices; and analysing the recorded temperature as a function of time for the plurality of sites to determine the number of individual water use events for each of the plurality of sites.

The temperature logging devices may be installed in respective external chambers each housing a temperature logging device.

The temperature logging devices may be installed in respective buildings each housing a temperature logging device.

The water consumption surveying method may further comprise: transferring the recorded temperature as a function of time from the plurality of temperature logging devices to a separate computer and wherein the separate computer carries out the analysing.

The recorded temperature may be transferred to the separate computer while the temperature logging devices are in situ, for example located in external chambers or in buildings.

The water consumption surveying method may further comprise: removing the temperature logging devices from where they were installed before the recorded temperature is transferred to the separate computer.

The analysing may be carried out by the temperature logging devices.

The water consumption surveying method may further comprise the temperature logging devices each transmitting a message including one or more results of their respective analysing to a remote computer.

The water consumption surveying method aspect of the invention may also include one or more preferred features of the preceding method aspect of the invention.

BRIEF DESCRIPTION OF THE DRAWINGS

Embodiments of the invention will now be described, by way of example only, and with reference to the accompanying drawings, wherein.

Similar items in the different Figures share common reference signs unless indicated otherwise.

DETAILED DESCRIPTION

Figure 1:
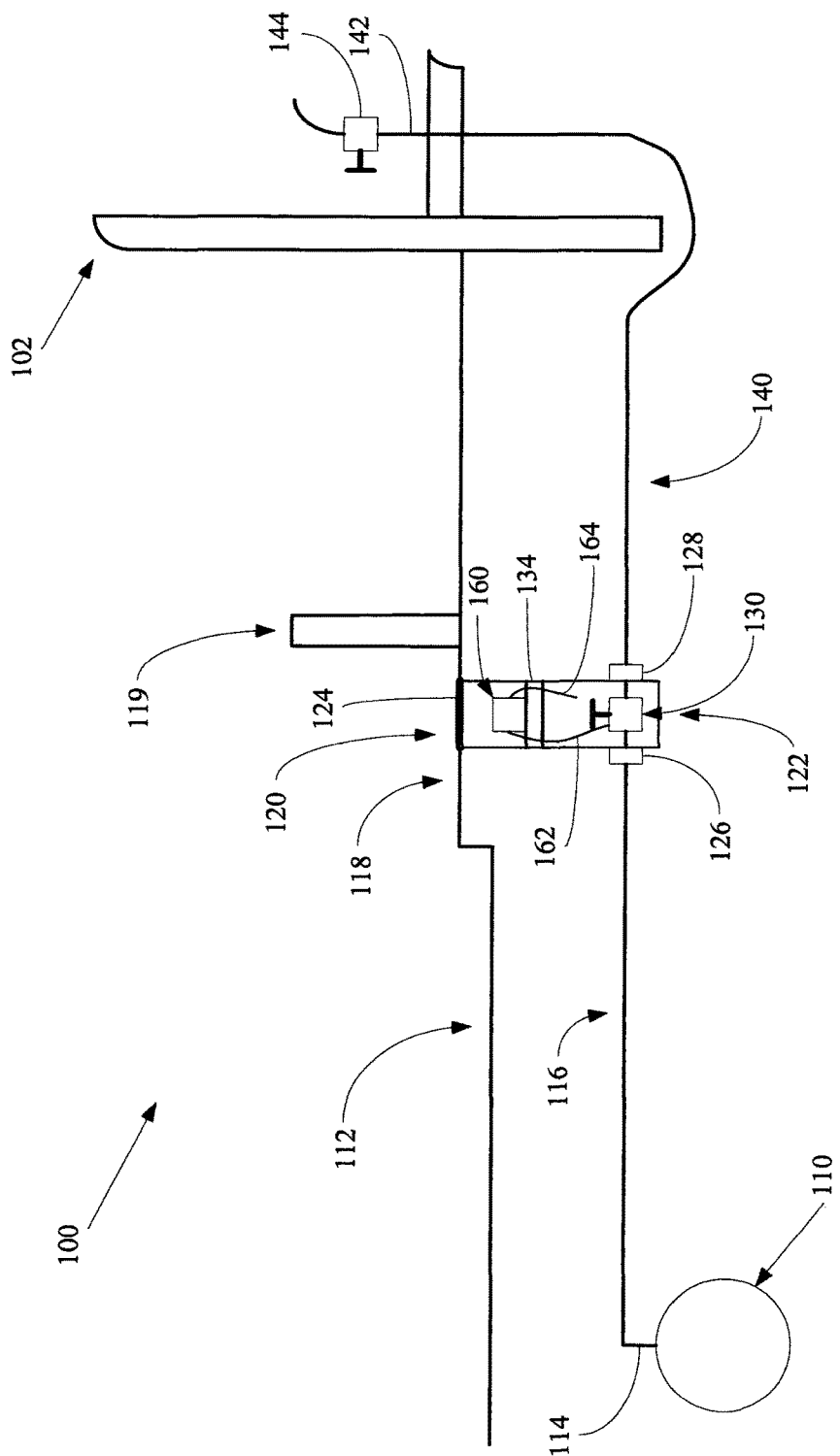
FIG. 1 shows a schematic block diagram of an installation according to an aspect of the invention and illustrating a method of water use surveying also according to an aspect of the invention.

With reference to FIG. 1, there is shown a schematic cross sectional diagram of a location 100 including an installation 120 according to an aspect of the invention associated with a site 102. At the illustrated location the site 102 is a domestic dwelling and in particular is a house. It will be appreciated that in other embodiments the site may take other forms, for example it may be a commercial site, and may be any site which has a water supply derived from a local water main. In FIG. 1, a water main 110 forms part of a water distribution network and is buried approximately 1 m below the surface 112 of a road. A ferrule 114 extends from an upper part of the water main pipe and is in fluid communication with a first portion 116 of a service pipe at depth of typically approximately 0.75 m and which extends from the water main 110 to underneath a pavement 118, typically over a distance of a few metres.

An outside stop-tap or meter chamber 122 is provided below pavement 118 and includes a pilotable cover 124 which can be opened to provide access to the interior of the chamber 122. The chamber 122 is generally provided close to the boundary of a property, as illustrated by boundary wall 119, but in a publicly accessible location, rather than on private property. A first connector 126 is provided on an upstream side of the chamber and a second connector 128 is provided on a downstream side of the chamber. A stop-tap or stop-tap and meter assembly 130 is provided within the chamber and in fluidic communication with the first and second connectors. An insulating member 134, for example in the form of a piece of polystyrene, extends across the interior of the chamber 122 and acts to insulate the lower part of the chamber from the environment above. A temperature logging device 160 is located on the insulating member 134 and includes a first temperature sensor 162. Optionally, in some embodiments, the temperature logging device may also include a second temperature sensor 164.

First portion 116 of the service pipe may sometimes be referred to herein as the communication pipe, although strictly speaking "communication pipe" means the part of the service pipe between the water main and the property boundary, being wall 119 in this example. Hence, when the chamber 122 is close to or at the property boundary then the first part of the service pipe 116 does correspond to the stricter meaning of communication pipe. However, communication pipe may generally be used herein to refer to the part of the service pipe between the main 110 and the chamber 122 irrespective of the location of the chamber relative to the boundary of the property.

The first temperature sensor 162 is in thermal communication with at least a part of the stop-tap or stop-tap and water meter assembly 130 (generally referred to hereinafter simply as the stop-tap). The first temperature sensor can be connected to any exposed part of the stop-tap, such as the T-handle or the body, or any connector or pipe exposed within chamber 122. If a stop-tap and water meter assembly is present then the first sensor is preferably attached downstream of the water meter, or any water meter receiving part if no water meter is actually present, for example between the water meter part and the stop-tap part of the assembly.

In embodiments in which the second temperature sensor 164 is also provided, the second temperature sensor 164 is place in thermal communication with the environment surrounding the stop tap 130. For example, the second temperature sensor may be attached to a side wall of the chamber or inserted into the soil through the chamber wall.

The downstream connector 128 is in fluid communication with an underground supply pipe 140 which extends underground and beneath (or through) an exterior wall 142 of the house 102 to an internal stop-tap 144 to supply water to the interior of the house 102. The supply pipe 140 can extend a few or tens or even hundreds of meters from the chamber 122 to the internal stop-tap 144. The internal stop-tap 144 is generally referred to or known as the point of consumption, where consumption includes both intended water usage and also any leaks or other unintended ways in which water is drawn. The utility supply company is generally responsible for all the parts of the water supply system from, and including, the water main 110 to the downstream connector 128, which is generally referred to, or known as, the point of delivery. The consumer is then generally responsible for the parts of the water supply system from the point of delivery and within their property.

The invention is also applicable to an internal stop-tap within a property. Hence, in circumstances where access to the property and internal stop-tap is possible, then the temperature logging device may be located at the internal stop-tap 144 and the first temperature sensor connected to a part of the internal stop-tap. The operation and principles of the invention are generally similar to that for an external stop-tap as illustrated in FIG. 1 and described below, except that the relevant portion of the water supply system is the part 142 of the supply pipe 140 downstream of and adjacent to the internal stop tap 144. Also, the environment surrounding the stop-tap will be that surrounding the internal stop-tap 144.

Figure 2:
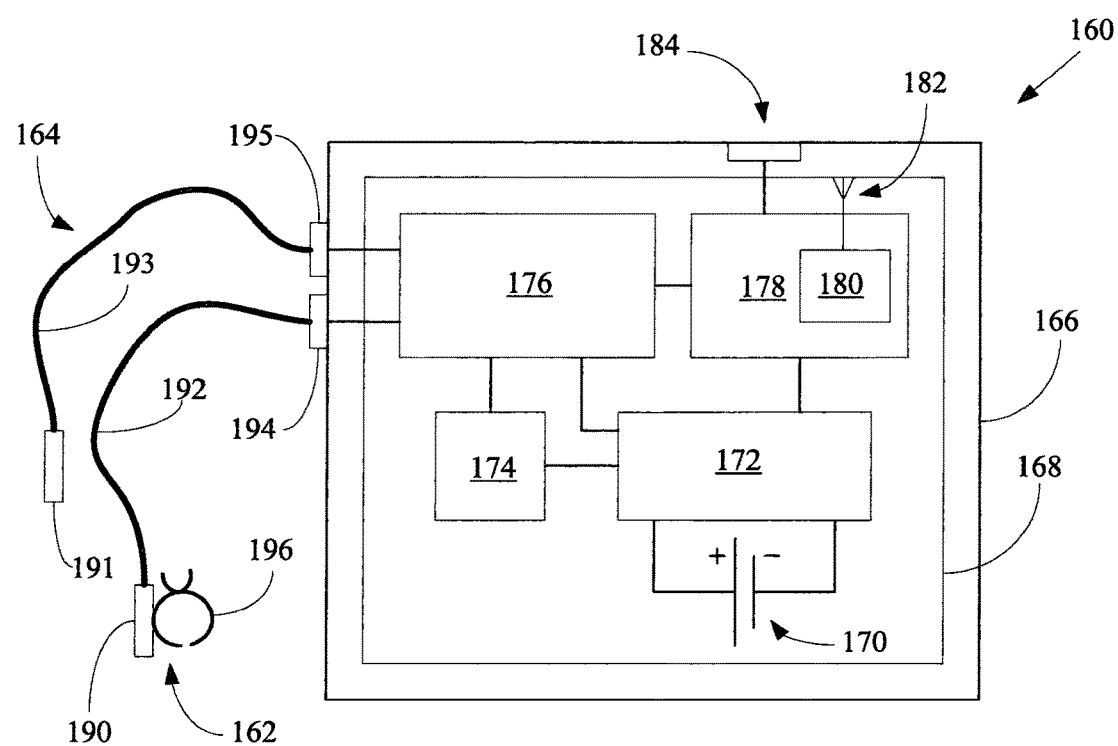
FIG. 2 shows a schematic block diagram of a temperature logging apparatus being a part of the installation shown in FIG. 1.

With reference to FIG. 2, there is shown a schematic block diagram of the temperature logging apparatus or device 160 including the first temperature sensor 162 and optionally the second temperature sensor 164. The temperature logging device includes an outer housing 166 which houses and protects electronic circuitry 168 and which is generally weather resistant or weather proof. The electronic circuitry 168 includes a power supply 170, such as a battery, which provides a source of electrical power to various parts of the device. The circuitry 168 also includes a controller 172 and a clock 174 which can be set to, and provides a signal indicative of, the current time. The clock 174 is connected to the controller 172 and also a data logging circuit 176 which includes one or more memory devices for storing data. Data logging circuit 176 is in communication with controller 172 and also with an input/output interface 178, which in some embodiments may include a wireless transceiver circuit 180 and associated antenna 182. An input/output connector 184 is provided in communication with input/output interface 178 for connecting the device 160 via a cable to a computer to transmit logged data and/or send or receive other data and/or control or command signals. In more complicated embodiments, the wireless transceiver 180 may be provided additionally or alternatively to wirelessly transmit logged data and/or send or receive other data and/or control or command signals and/or send messages or notifications to remote devices. In some embodiments a local area wireless protocol may be used, such as Bluetooth, whereas in other embodiments, a wide area wireless protocol may be used, such as a Wi-Fi protocol. In yet further embodiments, the wireless transceiver 180 may implement wireless telephony and hence may be also be communicate, and/or send communications using SMS or electronic mail, via a wireless telephone network.

The first temperature sensor 162 includes a thermistor 190 and a cable 192 connected to a first sensor connector 194 of the housing 166 and in communication with the logging circuit 176. The thermistor 190 is attached in good thermal contact to a metal clip 196 by which the thermistor 190 can be releasable attached in good thermal communication with a part of the external stop-tap 130. The second temperature sensor 164 includes a further thermistor 191 and a cable 193 connected to a second sensor connector 195 of the housing 166 and also in communication with the logging circuit 176. It will be appreciated that other temperature sensitive transducers can be used instead of thermistors 190, 191 such as thermocouples.

The controller 172 is configured to control the temperature logging device 160 to periodically record the temperature measured by each of the first and second temperature sensors and the time of measurement in the logging circuit 176. Calibration data is stored on the logging device to convert the electrical signals generated by the sensors into temperature data. The controller can be programmed via interface 178 to set how often temperature measurements are taken and over what time, e.g. every minute for five days. The controller can also be programmed via interface 178 to set a current time and date for clock 174 so that data representing the time and date of measurement and measured temperature can be recorded and stored in logging circuit 176. The interface 178 can also be used to download the stored temperature and time data to an analysis computer for data processing.

In other embodiments, controller 172 of logging device 160 includes data processing circuitry to carryout data processing on the recorded temperature and time data itself as described in greater detail below.

Figure 3:
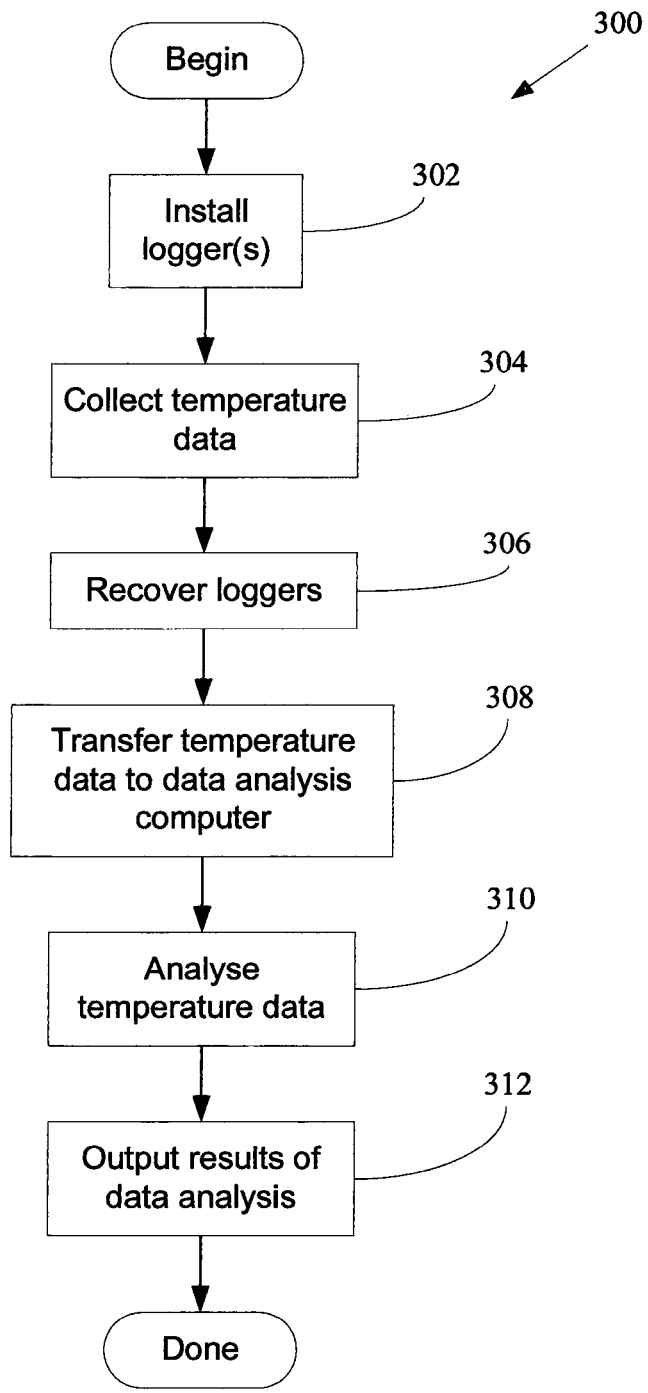
FIG. 3 shows a flow chart illustrating a first embodiment of a method of water surveying according to an aspect of the invention.

FIG. 3 shows a schematic block diagram of a first embodiment of a method of water surveying 300 according to an aspect of the invention. The method 300 begins at 302 with installing a temperature logging device 160 in the external stop-tap chamber 122 associated with a site for at least one or a plurality of different sites, with each site being attached to the same water main. The cover 124 is pivoted open and the insulating part 134 removed, if present. Any debris covering the stop-tap 130 is cleared away to provide access and possibly removed. As described above with reference to FIG. 1, the first temperature sensor is placed in thermal communication with an exposed part of the external stop-tap. In some embodiments, the first temperature sensor 162 may be clipped to the T-handle of the stop tap or to the body of the stop tap or any exposed part of the upstream 126 or downstream connector. However, these latter parts may be less easily accessible and more difficult to attach the temperature sensor to. In embodiments in which the second temperature sensor 164 is also used, the second temperature sensor may be placed in thermal communication with the side wall of the chamber or located in the soil adjacent the chamber. The insulating member 134 is then reintroduced into the chamber and the temperature logging apparatus housing 166 is placed on the upper side of the insulating member with the first temperature sensor cable 192, and second 193 when present, connected. The temperature logging apparatus can then be set to start logging temperature as a function of time and the cover 124 closed.

The second temperature sensor may be used to assess the temperature of the surroundings of the communication pipe 116 adjacent the chamber. This may be used as an input to the calculation of continuous flow past the stop-tap as described in greater detail below.

In some embodiments, a single temperature logger may be installed to determine the water consumption of a single site, but in others, a plurality of temperature loggers are installed with a separate, respective temperature logger installed in a respective external stop-tap chamber associated with each respective site. For example, a temperature logging device may be installed for each house or property in a street or a plurality of streets attached to the same water main or to different water mains. In this way the water usage of tens, hundreds or even thousands of properties may be surveyed, but without requiring access to any private property, whether land or buildings.

At step 304, temperature data is collected by each logger as a function of time. The temperature may be measured and stored for each temperature sensor, every few or tens of seconds, e.g. two to five seconds up to thirty seconds, for several days, e.g. five days. After the temperature data has been collected and recorded at step 304, then at step 306, each temperature logging device is removed from the external stop-tap chamber. Then, the recorded temperature and time data are downloaded from the temperature logging devices to an analysis computer at step 308. A data transfer cable, e.g. a serial data cable, may be connected between the port 184 of each data logging device in turn and the data analysis computer and the recorded temperature and time data are transferred to the data analysis computer and stored in association with data uniquely identifying the site with which the downloaded data is associated, e.g. address data or a site identifier which is itself associated with site address data. The recorded data on the temperature logging device may then be deleted from the memory of the temperature logging device so that it may be re-used in other surveys.

At step 310, the temperature data is analysed to determine one or more properties indicative of water consumption associated with each site. This may include categorising the site as falling within a particular category of water consumption or usage. In some embodiments, the temperature data may be analysed on an individual site basis at step 310. This approach may be used when only a single site has been surveyed. In other embodiments, the temperature data may be analysed in a comparative or relative manner by using temperature data from a plurality of sites and comparing one site with one or more other sites. Various methods of data analysis may be used at step 310 and are described in greater detail below. The data analysis methods used at step 310 generally involve extracting one or more metrics or quantities (absolute or relative) from the recorded temperature data. The one or more metrics can then be used to determine a likely state or category of site being considered based on its likely water usage.

For example, the water usage may indicate that the site is normal or anomalous. An anomalous water usage may be indicative of one or more leaks, malfunctions or other unusual mechanisms causing water to be drawn from the water mains. As used herein "water consumption" and "water use or usage" are generally used to mean any flow of water drawn from the main by the site, including both intended use of water, e.g. a tap being turned on, a shower being run, a dishwasher or washing machine filling, and also unintended use, such as various leaks, malfunctions or other anomalous water use associated with either the customer side part of the water supply system (e.g. a leak in the supply pipe 140) and/or the plumbing or appliances at the site (such as leaking or malfunctioning domestic appliances, water tanks, pipes, taps, cisterns, etc.) including accidental use or misuse (e.g. a tap left on).

At step 312 the results of the data analysis step 312 may be output. The output may be in various forms and may include various data and/or other information. The output may include at least an indication of each site which appears to be exhibiting some anomalous water usage, for example possibly having a leak. The output may also include an indication of the state or category of each site included in the survey. The output may be in the form of a hard copy or soft copy report including a graphical representation of the recorded temperature data for each site in the survey, or only the anomalous sites. The output may additionally or alternatively include or consist of a message or notification sent to an interested party, such as the utility company responsible for the water supply network indicating which site or sites are exhibiting anomalous water usage. Hence, the utility company may then take remedial action to further investigate and/or address the anomalous water usage, such as contacting the owners or residents at the site to try and arrange a site visit to fix or otherwise remedy the source of the anomalous water usage, such as replacing or fixing seals, washers, taps, plumbing appliances, water storage tanks, pipes or similar.

Although not wishing to be bound by theory, it is believed that for certain periods of time a large proportion, in some networks perhaps as much as half, of the water introduced into the water supply system, and which cannot be accounted for by intended use or known leaks using current methodologies and assumptions, may be attributable to continuous flows including small otherwise undetectable leaks, such as constantly dripping or running taps or constantly filling water tanks or cisterns, at a very large number of domestic and commercial sites. Although the rate of anomalous water usage at any individual site at any time may be low and otherwise unnoticeable, when encountered at a very large number of sites simultaneously, for example millions of dwellings, and for very long periods of time, for example several years, the total amount of wasted water drawn from the main supply system may be very significant.

Before describing the data analysis methods used at step 310 in greater detail, other embodiments of the water surveying method of the invention will be described with reference to FIGS. 4 and 5. Many of the steps of FIGS. 4 and 5 and similar to those of FIG. 3 and so are not described in detail again.

Figure 4:
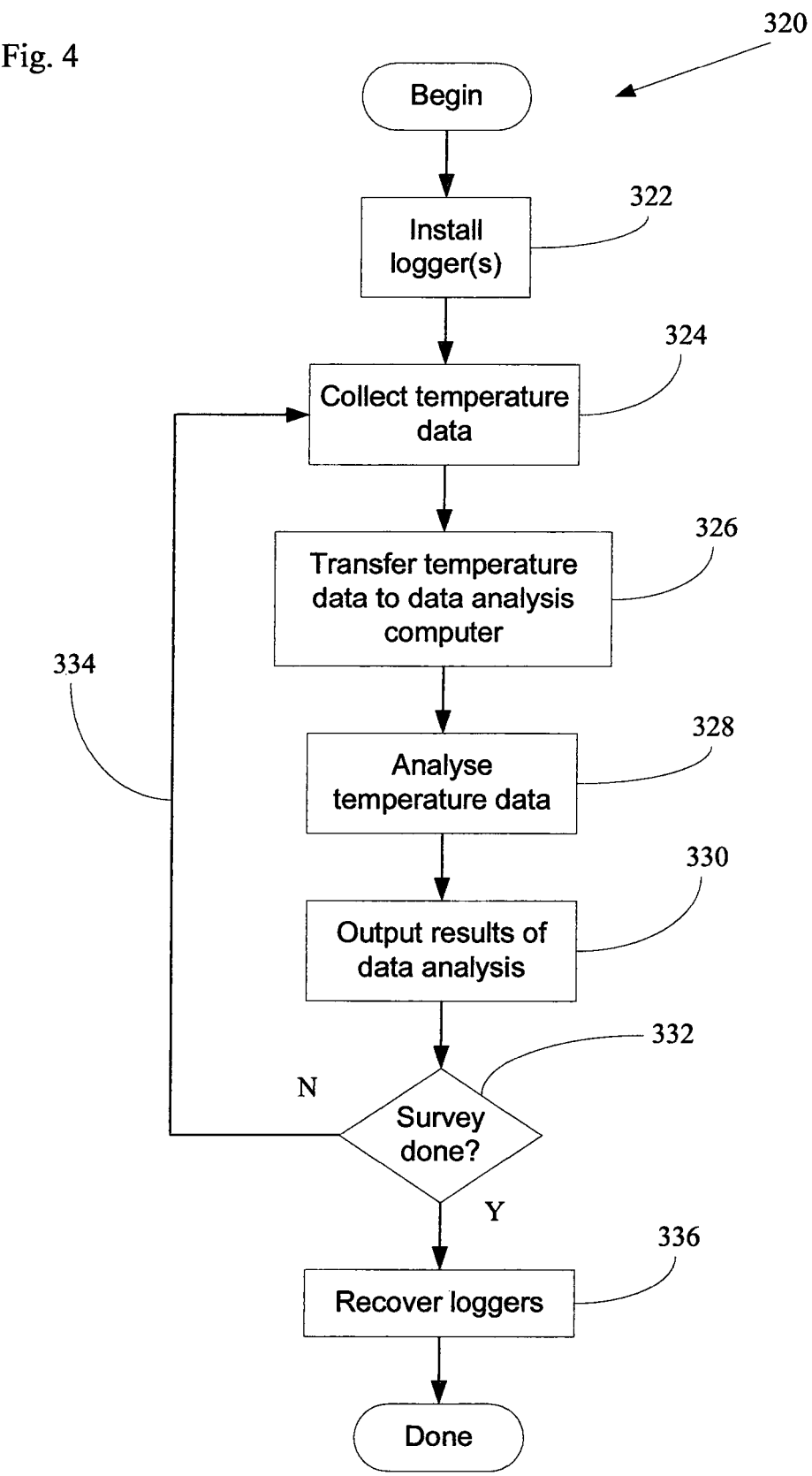
FIG. 4 shows a flow chart illustrating a second embodiment of a method of water surveying according to an aspect of the invention.

FIG. 4 shows a second embodiment of a water surveying method 320 according to an aspect of the invention. At step 322 one or more temperature logging devices are installed and which include a local area wireless interface via which they can communicate, such as one operating according to a version of the Bluetooth standard. Control signals may be wirelessly transmitted to the temperature logging devices to start and stop the measurement and recording of temperature data and also the rate of data collection when conducting a survey. After temperature data has been collected at 324, the recorded temperature and time data are wirelessly transferred from each temperature logging device to a data analysis computer The data can be transferred to the data analysis computer directly or indirectly by a wirelessly connected storage device which is brought proximate to the site(s) by an engineer or other water surveying operative using a local wireless connection, such as utilising the Bluetooth standard. Alternatively, the data can be wireless transferred to a relay station which transfers it via GPRS or other protocol to the data analysis computer. The transferred temperature data is then analysed at 328 and the results output at 330. Based on the output results it may be determined at 332 that more data needs to be collected to complete the survey and or check or otherwise validate the results. Hence, as illustrated by return line 334, more temperature and time data may be collected for a further period of time if it is determined at step 332 that the survey is not yet complete. When it is determine at step 332 that no further data needs collecting in order to complete the survey, then optionally, the temperature logging devices may be recovered. In other embodiments, the temperature logging devices may be left in situ in order to survey those same sites at a later date.

Figure 5:
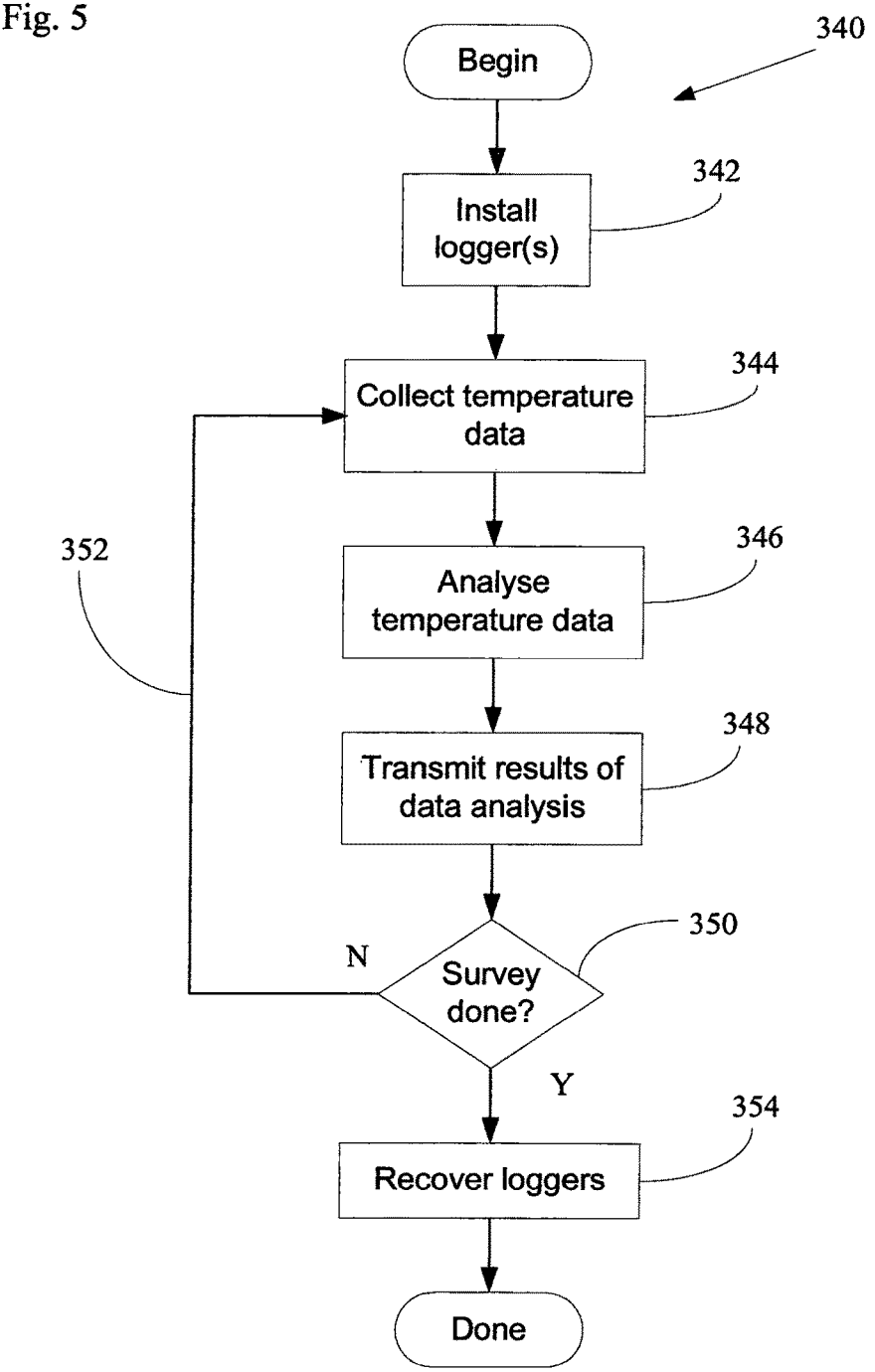
FIG. 5 shows a flow chart illustrating a third embodiment of a method of water surveying according to an aspect of the invention.

FIG. 5 shows a third embodiment of a water surveying method 340 according to an aspect of the invention. At step 342 one or more temperature logging devices are installed and which include a wide area wireless interface, such as one operating according to a mobile telephony standard such as GPRS, 3G or 4G. Messages may be wirelessly transmitted to and from the temperature logging devices including control signals, command and/or data to start and stop the measurement and recording of temperature data, the rate of data collection when conducting a survey, parameters or arguments used in the data analysis and the results of the data analysis. The temperature logging device may also include circuitry allowing the position of the temperature logging device to be determined, such as a GPS device. Hence, data indicating the location of the site can also be wirelessly transmitted from the temperature logging device. After temperature data has been collected at 344, the recorded temperature and time data are analysed at 346 by the temperature logging device and the results of the data analysis, such as the status or category of the site and data allowing the site to be identified (such as position or address data and/or temperature logging device identifier) are transmitted at step 348 in a message or notification to an interested party, such as the water utility provider and/or the party conducting the survey. Based on the data analysis and/or output results it may be determined at 350 that more data needs to be collected to complete the survey and or check or otherwise validate the results. Hence, as illustrated by return line 352, more temperature and time data may be collected for a further period of time if it is determined at step 350 that the survey is not yet complete. When it is determined at step 350 that no further data needs collecting in order to complete the survey, then optionally, the temperature logging devices may be recovered. In other embodiments, the temperature logging devices may be left in situ in order to survey those same sites at a later date. In other embodiments, the temperature logging devices may be permanently installed in the external stop-tap chamber to allow the water usage to be surveyed at any time, for example annually. The temperature logging device may be provided as part of, or in association with, a water meter or water meter assembly in the external stop-tap chamber either when the water meter is installed or retroactively.

Figure 6:
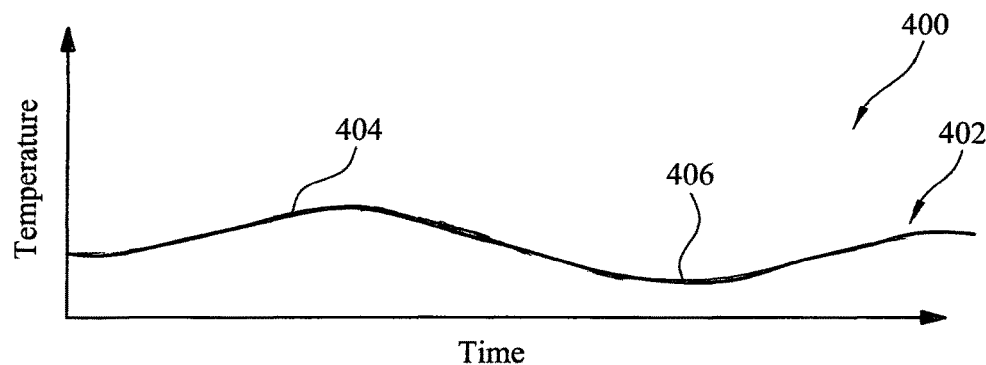
FIG. 6 shows a graphical representation of a plot of temperature as a function of time for a site exhibiting normal water usage for an unoccupied site.

Before describing the data analysis methods that may be used in detail, the underlying principles will be explained with reference to FIGS. 6 to 9. FIG. 6 shows a graph 400 illustrating the measured temperature 402 of an external stop tap associated with a first site as a function of time over approximately 24 hours. FIG. 6 illustrates a first site that has no leaks on the consumer side and for which no water flow causing events occur during the 24 hour period, for example an unoccupied dwelling. As can be seen in FIG. 6, the variation in temperature of the external stop-tap has a generally smooth form and is essentially modulated by the temperature of the immediate environment of the external stop-tap chamber. As there are no events in the site which cause water to be drawn from the water main, the stop-tap chamber temperature follows that of its immediate environment. The temperature of its immediate environment, essentially the ground beneath the pavement 118 and surrounding the chamber follows the outside temperature above ground but with a time lag owing to the low thermal conductivity of the ground. The temperature within the external stop-tap chamber is approximately in anti-phase with the outside temperature and so is a maximum 404 at night time (being about 12 hours after maximum outside temperature around midday) and a minimum 406 in day time (being about 12 hours after minimum outside temperature around midnight). Hence, this variation of temperature with time can be considered a baseline or background variation of temperature which indicates no water usage at all. The exact form of line 402 will depend on a number of factors including the outside temperature, time of year, depth of the stop-tap chamber, insulation and the properties of the ground surrounding the chamber. The average value of the temperature and range of variation will depend on the time of year and outside temperature. For example, during a typical autumn in the UK the average value might be about 10° C. and the variation may be in the range of about ±2° C.

Figure 7:
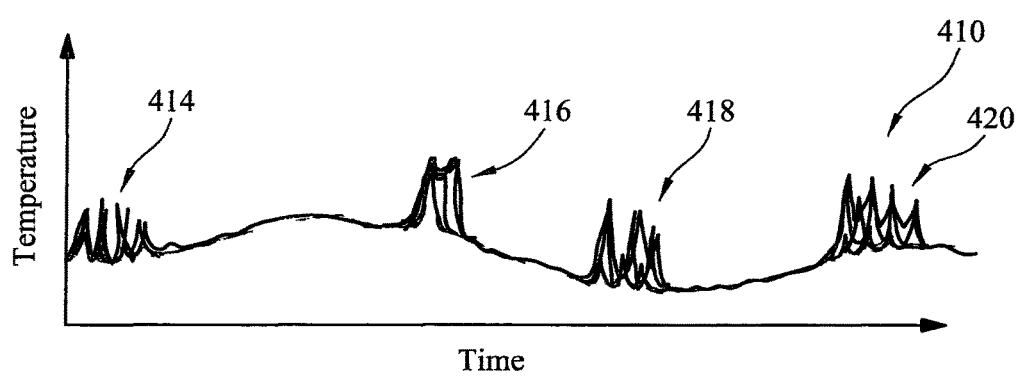
FIG. 7 shows a graphical representation of a plot of temperature as a function of time for a site exhibiting normal water usage for an occupied site.

FIG. 7 shows a graph 410 illustrating the measured temperature 410 of an external stop tap associated with a second site as a function of time over approximately 24 hours. FIG. 7 illustrates a second site that has no leaks on the consumer side and for which several water flow causing events occur during the 24 hour period, for example an occupied dwelling. As can be seen in FIG. 7, the variation in temperature of the external stop-tap has the same generally smooth baseline variation with a number of peaks each corresponding to one or more water use events on the site which have caused water to be drawn from the water main and through the external stop-tap associated with the site. In this example, it is assumed that the temperature of the water in the water main is greater than the maximum temperature of the external stop-tap chamber. Hence, water drawn from the main and passing through the external stop-tap increases the temperature of the stop-tap by conduction of heat and hence is seen as an increase in the measured temperature. Transient water drawing events therefore appear as peaks in a plot of the temperature as a function of time as shown in FIG. 7.

The temperature of water in the main 110 tends to vary less over the day than the temperature of the soil surrounding the communication pipe 116 and external stop-tap. For simplicity of explanation purposes it is assumed herein that the temperature of the water in the main remains substantially constant over a twenty four hour period.

At some times the temperature of the water in the water main may be less than the temperature of the external stop-tap chamber. Hence, water drawn from the main and passing through the external stop-tap reduces the temperature of the stop-tap and hence is seen as a decrease in the measured temperature. Transient water drawing events therefore appear as troughs in a plot of the temperature as a function of time.

FIG. 7, may be interpreted as showing a number of transient water use events 414 in the evening, for example people washing and preparing for bed, then no water use events for a period during the night, then a washing machine filling and operating in the early morning 416, then transient water use events 418 in the morning, e.g., as people shower and run taps making breakfast, then none for a period during the day as the site is unoccupied, and then a final group of water use events 420 in the early evening as people return to the site, e.g. preparing an evening meal, washing up, etc.

Figure 8:
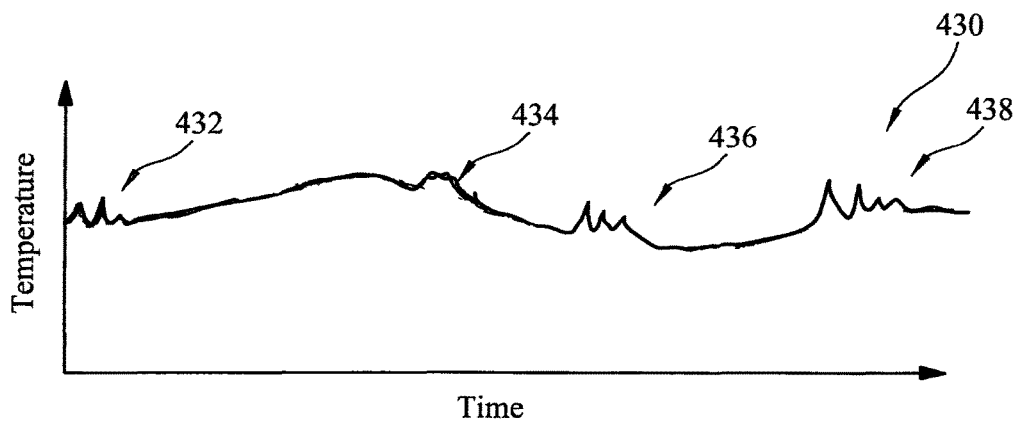
FIG. 8 shows a graphical representation of a plot of temperature as a function of time for a first site not exhibiting normal water usage.

FIG. 8 shows a graph illustrating the measured temperature 430 of an external stop-tap associated with a third site as a function of time over approximately 24 hours. FIG. 8 illustrates a third site that has one or more minor leaks on the consumer side, such as a constantly filling toilet cistern, dripping tap or similar, and for which several water flow causing events occur during the 24 hour period, for example an occupied dwelling. As can be seen in FIG. 8, the variation in temperature of the external stop-tap has a component corresponding to the generally smooth baseline variation, but the diurnal variation in this baseline is smaller than in FIG. 7. The temperature also has a greater average value compared to FIGS. 6 and 7, and with a number of peaks each corresponding to one or more water use events on the site which have caused water to be drawn from the water main and through the external stop-tap associated with the site.

The higher smooth baseline temperature in FIG. 8, compared to FIG. 7, is because as water is continuously drawn through the communication pipe and outside stop-tap the water heats the stop-tap to a higher temperature. The conduction of heat from the water to the communication pipe surroundings also reduces the temperature of the water. In the example of FIG. 7, with a low continuous flow rate, the water has a longer residence time within the communication pipe, giving it a long time to conduct heat into the communication pipe and the soil surrounding it, so it arrives at the stop-tap at a temperature between that of the water in the main and that of the soil surrounding the communication pipe and the stop-tap chamber. This explains both the higher baseline temperature in FIG. 8 compared to FIG. 7 and the reduced diurnal variation in the baseline temperature.

Also, comparing FIG. 8 with FIG. 7, it can be seen that the size of the peaks 432, 434, 436, 438 corresponding to the same water use events of FIG. 7, relative to the baseline is smaller. The presence of the leak on the consumer side means that there is a constant flow of water from the water main through the external stop-tap and hence a constant heating effect and therefore the average temperature of the baseline is greater than compared to the first and second sites illustrated by FIGS. 6 and 7. Also, the peaks corresponding to transient water use events, such as showers, taps being run, washing machine fill and use, toilet flushes etc., are smaller in amplitude as there is a lesser temperature differential between the temperature of the external stop-tap (owing to it being in thermal equilibrium with its immediate environment) and the temperature it can be warmed to owing to water being drawn through it from the water main owing to water use events on the site.

Figure 9:
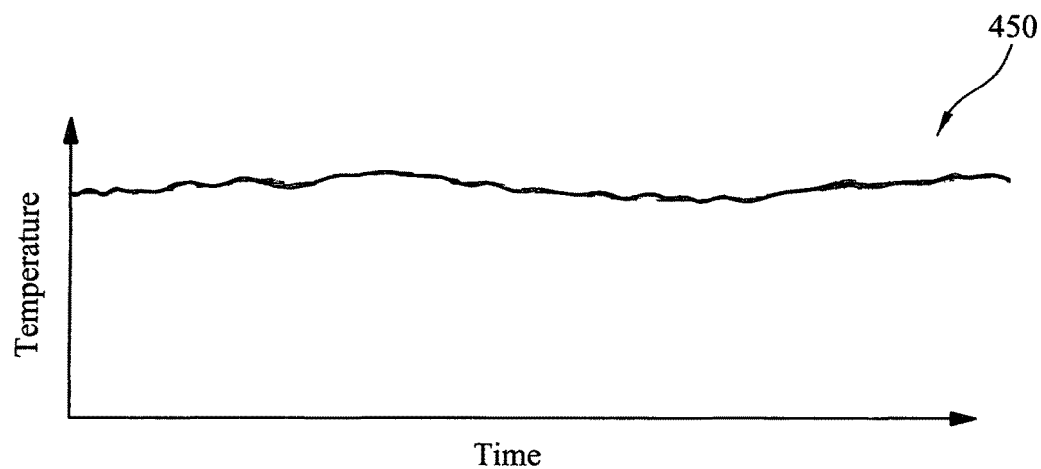
FIG. 9 shows a graphical representation of a plot of temperature as a function of time for a second site not exhibiting normal water usage.

FIG. 9 shows a graph illustrating the measured temperature 450 of an external stop tap associated with a fourth site as a function of time over approximately 24 hours. FIG. 9 illustrates a fourth site having at least one significant leak on the consumer side, such as a constantly running tap or a break in the supply pipe, and for which several water flow causing events occur during the 24 hour period, for example an occupied dwelling. As can be seen in FIG. 9, the variation in temperature of the external stop-tap has a generally constant value, possibly with some remnant of the baseline modulation, and with some minor ripples and having a greater average value compared to FIGS. 6, 7 and 8. No distinct peaks corresponding to water use events on the site which have caused water to be drawn from the water main and through the external stop-tap associated with the site can easily be identified.

The presence of the more significant leak or leaks on the consumer side means that there is a significant constant flow of water from the water main through the external stop-tap and hence a constant heating effect. Also, the high flow rate leads to low residence time of the water in the communication pipe so the water does not take on the smooth daily variation in the soil temperature around the communication pipe but retains its constant temperature. Therefore the average temperature of the baseline is greater, and the variation in temperature is lesser, than compared to the first and second sites illustrated by FIGS. 6, 7 and 8. Also, no peaks corresponding to transient water use events, such as showers, taps being run, washing machine fill and use, toilet flushes etc., can be easily identified, if at all, as there is little or no temperature differential between the temperature of the external stop-tap (owing to it being in thermal equilibrium with its immediate environment) and the temperature it has been warmed to owing to water being drawn through it from the water main owing to water use events on the site.

In the scenario illustrated in FIG. 9, the temperature of the external stop-tap essentially follows the temperature of the water in the water main as large amount of water is constantly being drawn from the main and through external stop-tap owing to the leak(s) at the site. Hence, the temperature of the external stop-tap is generally constant, subject to any longer time modulation owing to variation of the temperature of the water in the water main.

Figure 10:
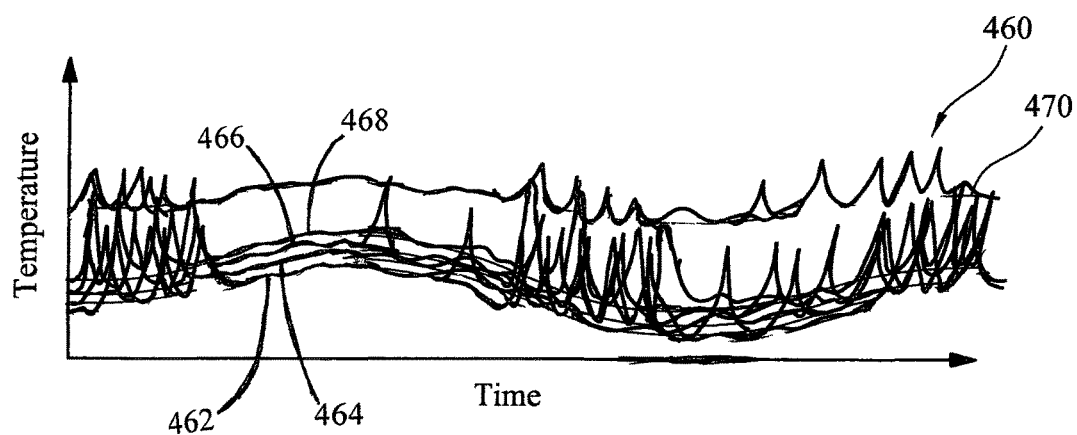
FIG. 10 shows a graphical representation of a plot of temperature as a function of time for a plurality of sites exhibiting different types of water usage.

Hence, by analysing the recorded temperature as function of time it is possible to identify sites having some form of anomalous water use. This can be done using methods which analyse the temperature data for a single site on its own, e.g. just the data plotted in each of FIGS. 6 to 9, or methods which analyse and compare temperature data for a plurality of sites. The principle behind this latter relative approach is illustrated in FIG. 10. FIG. 10 shows a graph 460 illustrating recorded temperature data for a 24 hour period for five separate sites 462, 464, 466, 468, 470 each connected to the same water main. As can be seen one of the sites has a generally higher average temperature than the other sites and smaller amplitude peaks corresponding to transient water use events and therefore is likely to correspond to a site having some form of anomalous water consumption, such as a leak.

As noted above, a similar approach can be used to assess flow rates by measuring the temperature of the internal stop tap 144 instead of the external stop-tap.

Various different data processing methods which may be used individually or in combination as part of the data analysis steps of the overall surveying method will now be described in more detail. The data processing methods may be implemented by suitable software operating on the temperature and time data recorded by the temperature logging device. The data analysis software may be provided on the data analysis computer, in embodiments where the recorded data is transferred from the temperature logging device or provided on the temperature logging device itself, or distributed between the two.

Without limiting the types of data analysis methods that may be used, generally some of the data analysis methods may be categorised as relating to: (i) one or more properties of the temperature peaks or temperature troughs; or (ii) the temperature between the temperature peaks or temperature troughs corresponding to water use events; or (iii) combinations of (i) and (ii). Combinations of (i) and (ii) may be used to validate or otherwise check the results of either approach. In some data analysis methods the one or more properties of the temperature peaks or troughs may be either (a) relative to the difference between the mains water temperature and the temperature of the surroundings to the communication pipe and stop-tap or (b) relative to the properties of peaks or troughs at or of other similar or nearby stop-taps. For example stop-taps for which the temperature of the water in the mains, the temperature of the communication pipe and stop-tap surroundings and the communication pipe and stop-tap configurations are similar. These similarities will usually be because they are near to each other, were constructed to similar designs and are fed from the same water main.

The temperature of the surroundings to the communication pipe and stop tap is generally the temperature that the stop tap 130 would have at thermal equilibrium in the absence of any water flow along the communication pipe and where the stop-tap is sufficiently insulated from the surface that heat flow between the stop tap and other items is dominated by heat flow between the stop-tap and the immediate surroundings of the stop-tap chamber at communication-pipe depth. This can be measured, for example, by placing the second temperature sensor into the soil surrounding the communication pipe at communication pipe depth at sufficient distance from the communication pipe for the influence of the water temperature within the communication pipe not to significantly influence the measured temperature. This can also be measured, for example, by measuring the stop tap temperature at a second site which is known to have no flow through the communication pipe where the geometry and thermal conditions of the stop-tap and communication pipe are similar to those at the site of interest.

For the purposes of calculating water flow rates in the equations used herein the temperature at the stop-tap in the absence of flow is assumed to be equal to the temperature of the immediate surroundings to the communication pipe in the absence of water flow. It is also assumed in the equations used herein that the communication pipe is sufficiently long that the influence of the temperature of the water in the main on the temperature of the surroundings to the communication pipe (in the absence of any water flow along the communication pipe) is negligible.

In some data analysis methods, the temperature between the temperature peaks or temperature troughs may be relative to: (a) mains water temperature and/or the temperature of the surroundings to the communication pipe and stop-tap or (b) the temperature at or of other stop-taps where the temperature of the water in the mains, the temperature of the communication pipe surroundings and the communication pipe and stop-tap configurations are similar. These similarities will usually be because they are near to each other, were constructed to similar designs and are fed from the same water main.

Some of these methods use the temperature of the water in the mains (Tw) and the temperature of the surroundings to the communication pipe and stop-tap (Ts). These can be obtained by measurement or estimation in a number of different ways as listed below.

A value for $T_s$ can be obtained by: measuring soil temperature at the depth of the service pipe in one or more locations; measuring soil temperature at a different depth at one or more locations and extrapolating the soil temperature to the external stop-tap depth; extrapolation of soil temperatures from measured air temperature, surface type and weather conditions to external stop-tap depth; or estimation from simultaneously logged stop-tap temperatures in a group of local stop taps with similar configurations and similar thermal characteristics and fed from the same main.

A method for this last approach is as follows. A statistical measure of the extreme values (upper and lower) of measured stop-tap temperature is calculated, such as 2% ile and 98% ile of the temperatures in a six hour period centred on the time step for each site in the group. Other measures of extreme values could be used, such as other percentiles, or maximum and minimum values or by interpolating from extreme values measured at other time steps. It is then determined which extreme temperature (upper or lower) to use as the estimate of the temperature of the surroundings to the stop tap and communication pipe for each site. Several methods to identify this are possible. For example the extreme value (upper or lower) that is closest to the central-tendency of the values (such as the median value of the temperatures in a six hour period centred on the time step) is likely to be a good estimate of the temperature of the surroundings to the stop tap and communication pipe. Other methods could match the characteristic shape of peaks in temperature in response to intermittent use to the time series of measured stop-tap temperatures: if the matched temperature peaks were inverted (i.e. the temperature decreased in response to intermittent use) then the upper extreme value should be selected, otherwise the lower extreme value should be selected. The median value of the selected extreme values at each time step for all the sites is then selected. This produces one estimated temperature for the surroundings to the stop-taps and communication pipes in the group for each time step.

The temperature of water in the mains ($T_w$) can be obtained using one or more of the following methods. By local temperature measurements of mains fittings or the outside of the main. In this context "local" means at a point where it could reasonably be expected that the temperature of the water in the main was close to the temperature of the water in the main at the point where the connection to the stop-tap is. By local direct temperature measurements of the water at suitable fittings (such as washouts or hydrants). By local temperature measurements at fittings within properties at high flow rates for reasonable durations (typically greater than 5 l/min for greater than 20 minutes) so that water temperature changes due to heat transfer across the service-pipe wall are minimised. By local stop-tap temperature measurements during periods of high flow rates and long durations (typically greater than 5 l/min for greater than 40 minutes). By water temperature measurements made at treatment works or boreholes that feed the main. By extrapolation of temperature measurements using calculations of the rate of change of water temperature due to thermal conduction between the water and the main and main surroundings. By measured stop tap temperature at stop-taps (either the one where continuous flow is being assessed or nearby ones where mains water temperature is similar) when the soil and water temperature differential changes sign. The point at which this occurs can be identified from the change in the shape, size and sign of temperature peaks in reaction to intermittent use events. This change can be identified from inspection, from pattern matching or from analysis of the distribution of groups of individual temperature records from before and after the change of sign.

Three classes of analysis methods relating to one or more properties of temperature peaks or troughs will be described below referred to as first, second and third analysis approaches. In the following only peaks will be referred to for the sake of brevity, but it will be appreciated that the same applies for troughs also. Whether a water flow event corresponds to a peak or a trough in the recorded temperature data is simply a matter of whether the mains water temperature is more than or less than the temperature the external stop-tap would have at thermal equilibrium in the absence of any water flow.

First Class of Analysis Method Approaches

This approach uses the peak amplitude and shape to calculate a continuous flow rate for each stop tap. A library of theoretical peaks in temperature can be created corresponding to a set of known standard water use events (such as toilet flushes, washing-machine fills or bath fills) and each with different water flow-rates and durations. The theoretical peaks in temperature due to each different event type, flow rate and duration combination can be calculated as a function of:

the thermal properties of the combination of main, communication pipe, external stop-tap, surroundings of stop tap and communication pipe, the temperature difference between the water in the main and the temperature of the surroundings to the communication pipe and stop tap.

length of the communication pipe between the main and stop-tap;

the time since the last use event and the existing continuous flow rate past the stop-tap.

This library of water use events can be grouped into a smaller library of water use events which can be differentiated from each other.

Pattern matching algorithms (such as wavelet deconvolution, correlation, Markov or semi-Markov models or template matching) can be used to identify individual water use events from the logged temperatures at the stop tap that match events in the library and hence estimate the continuous flow rate on which that event is superimposed. Repeating this for several water use events gives several estimates of the continuous flow rate of water which can be used to estimate an average value of the continuous water flow rate. The continuous flow is likely to be either plumbing losses within the site or a leak in the underground supply pipe.

Second Class of Analysis Method Approaches

This approach uses the largest reliable amplitude of temperature peaks (in response to intermittent use) measured at the stop-tap, along with other data, to identify sites with continuous flow past the stop tap less than a threshold flow rate. This is useful because it can be used to reject sites that have continuous flow less than the flow rate of interest.

Briefly, the expected steady-state temperature of water passing the external stop-tap can be calculated from the temperature of the surroundings of the communication pipe and external stop-tap, the temperature of the water in the mains, the thermal properties of the communication-pipe surroundings, communication pipe length (measured from the main to external stop-tap) and the threshold continuous water flow rate of interest This can be used to calculate the maximum difference between the external stop-tap temperature and the temperature of water in the main for a given threshold continuous flow rate. That difference gives an upper limit to the possible amplitude of any peaks in temperature (from intermittent or transient water use events) for a given continuous flow rate. The largest peak amplitude in the measured stop-tap temperature can be compared to the upper limit. If the largest peak amplitude exceeds the upper limit that indicates that the actual continuous flow rate is below the threshold continuous flow rate.

The method to achieve this is in several steps: data pre-processing; calculating the upper limit to the peak amplitude for the threshold flow rate; assessing the largest reliable actual peak amplitude; and finally comparing the largest reliable actual peak amplitude to the upper limit to identify whether the continuous flow rate is below the threshold continuous flow rate.

The recorded temperature data may or may not be pre-processed or otherwise prepared. The 'raw' measured external stop-tap temperature data can be used. Alternatively the ratio (R) of the difference between the measured external stop-tap temperature and temperature of the communication pipe and stop-tap surroundings to the difference between the temperature of the water in the main and the temperature of the stop-tap surroundings. This ratio, R, can be used to stand-in for the stop-tap temperature in the following calculations with the temperature of the water in the mains (Tw) set at a value of 1.0 and the temperature of the communication and stop-tap surroundings (Ts) set at a value of zero.

The upper limit ($\nabla T_t$) to the amplitude of the peaks in temperature for a given threshold continuous flow rate ($q_t$) can be estimated using the following equation:

$$\nabla T_t = (Tw - Ts) \cdot \left(1 - e^{\left[\frac{-2\pi K_m l}{C_p \rho \cdot \ln\left(\frac{4Z}{d}\right) q_t}\right]}\right)$$

Where:
  $q_t$=threshold continuous flow rate past the external stop-tap (m³/s)
  Km=effective thermal conductivity of the surroundings of the communication pipe and stop-tap. This parameter can be assessed from actual temperatures as a function of measured flow rates, measured from samples of material or estimated from published typical values for soil thermal conductivity.
  l=length of communication pipe from the point where it leaves the main (or the point where the water temperature (Tw) is measured) to the point where the stop-tap temperature (Ts) is measured
  $C_p$=Specific heat capacity of water
  z=Depth of burial of the communication pipe.
  d=internal diameter of the communication pipe
  ρ=density of water
  $T_w$=Temperature of the water in the main
  $T_s$=Temperature of the surroundings to the stop-tap and
  $\nabla T_t$=the upper limit to the possible size of the peak in temperature as a result of intermittent use if the continuous flow past the external stop tap is $q_t$.

From the prepared data an assessment of the largest reliable temperature peak amplitude may be made using one or more of the following methods:
  Identifying the greatest change in external stop-tap temperature over a given time period corresponding to the time expected to take for the external stop-tap temperature to reach its greatest deviation from the temperature of its surroundings towards the mains water temperature.
  Using a statistical measure from the time series of measured temperature at the stop tap to give an indication of the largest reliable temperature peak amplitude (for example the difference between the 2% ile and 98% ile temperatures, logged at 30 second intervals for each 30 second interval over a rolling 6 hour time period and selecting the highest of these over a 48 hour period).
  Pattern matching to identify each temperature peak and calculate the amplitude of each temperature peak as a proportion of the difference between $T_w$ and $T_s$ at the time of the peak and then using a suitable statistical measure (such as the largest or the 99 percentile of all the amplitudes) to identify a reliable maximum value.
  Calculation of the largest reliable temperature peak amplitude of the water passing the stop-tap (in which the peak in temperature is likely to be larger amplitude than in the measured stop-tap temperature) from the largest reliable temperature peak amplitude in measured stop-tap temperature (from any of the preceding three approaches). This can use theoretical or experimental results that relate the amplitude of peaks in measured water temperature to the amplitude of peaks in measured stop-tap temperature for typical stop-tap designs. Calculated peaks in temperature of water passing the stop-tap will be larger than the peaks in measured stop-tap temperature but will still be smaller than $\nabla T_t$.

The largest reliable temperature peak amplitude derived from the steps set out above is then compared to the maximum amplitude ($\nabla T_t$) for the threshold continuous flow rate $q_t$. If it is larger than $\nabla T_t$ then the continuous flow rate is likely to be lower than the threshold continuous flow rate. This result can act as a check on the continuous flow rate calculated by other methods or it can be used to select a set of sites where continuous flows higher than the threshold continuous flow rate are possible, to focus further investigations.

Third Class of Analysis Method Approaches

For groups of two or more sites the peaks in the logged temperature at the external stop-taps can be used to identify which external stop-taps are likely to have continuous flow through them and/or confirm a continuous flow that is already suspected. In this context similar means that the temperature of the water in the mains, the temperature of the communication pipe and stop-tap surroundings and the communication pipe and stop-tap configurations are similar. These similarities will usually be because they are near to each other, were constructed to similar designs and are fed from the same water main. They may also have similar communication pipe lengths, from the water main to external stop-tap.

This approach includes the following steps: logging of temperatures simultaneously at each site; data processing to include only short-period temperature peaks produced in response to intermittent use events; data processing to produce descriptive statistics for the temperature peaks; and analysis of those statistics to produce an estimate of the flow rate at each site. These steps are described in greater detail below.

The temperature is logged at each of the external stop-taps and processed to provide time series data that includes mostly the shorter-duration peaks in temperature due to individual intermittent water use events by one or more of several methods including:
  none (if the logged temperatures do not include a significant long-period component);
  frequency filtering of the recorded data to remove low frequency signals (which will typically have a period greater than 6 hours);
  decomposition methods, such as calculating a rolling average over a time before and after each point in the time series data and subtracting this from the original time series data to leave only shorter duration features; and
  pattern matching to identify and quantify the temperature spikes due to individual water use events. Pattern matching algorithms can include Markov or semi-Markov approaches, correlation, wavelet deconvolution, neural network approaches or others. The calculation can use the temperature time series data or a differential of the time series data as an input. The output can include a time series of the times and amplitudes of the temperature peaks or reconstructed time series data that removes signals other than those due to the matched patterns of temperature peaks.)

The amplitude of variations in the processed time series data (which will include predominantly only the variations due to peaks in response to water use events) can then be assessed by one of several methods to produce amplitude statistics. This may include:

- amplitude statistics from the whole of the processed time series, such as temperature range, standard deviation, difference between two percentile values (such as 5% ile and 95% ile)
- amplitude statistics (as above) but limited to certain time periods (such as an early morning period or a period with a certain rate of individual use events)
- the amplitude of temperature spikes from a sample of individual use events identified from pattern matching.

This will produce one or more amplitude statistics for each external stop-tap. The amplitude statistics for the different external stop-taps in the group are then compared to identify ones that are likely to indicate continuous flow. This identification can be done by one or more of:

- identifying sites where the amplitude statistic fell below a given ratio to the mean or median (or other typical value measure) of the amplitude statistics of the whole group of sites.
- identifying sites where the amplitude statistic deviates from the distribution of amplitude statistics for the rest of the group of sites by more than a certain amount on the low side. For example if a single amplitude statistic has been calculated for each site and the median for that amplitude statistic for all other sites was 1° C. and the standard deviation in the amplitude for all other sites was 0.2° C., then a limit could be set where sites with mean amplitude of less than 0.6° C. (i.e. more than two standard deviations below the median and with an implied low probability of being part of the same distribution as the other sites) were identified as likely to have continuous flow.
- where the group consists of a small number of stop-taps and there is already a suspicion that one of the stop taps has continuous flow, then the continuous flow can be considered confirmed if the ratio of the amplitude statistic of the suspect stop-tap temperature to the mean of all the other stop-tap amplitude statistics (or the other stop tap amplitude if there is only one) falls below a threshold value ($A_t$). This threshold value can be calculated from the equation below:

$$A_t = \left(1 - e^{\left[\frac{-2\pi K_m l}{C_p \rho \cdot \ln\left(\frac{4z}{d}\right) q_t}\right]}\right)$$

Where:
- $q_t$=threshold continuous flow rate past the external stop-tap (m³/s)
- Km=effective thermal conductivity of the surroundings of the communication-pipe and stop-tap. This parameter can be assessed from actual temperatures as a function of measured flow rates, measured from samples of material or estimated from published typical values for soil thermal conductivity.
- l=length of communication pipe from the point where it leaves the main (or the point where the water temperature (Tw) is measured) to the point where the stop-tap temperature (Tst) is measured
- $C_p$=Specific heat capacity of water
- z=Depth of burial of the service pipe.
- d=internal diameter of the service pipe
- ρ=density of water Fourth Class of Analysis Method Approaches Continuous water flow can be identified and quantified from measuring or assessing three temperatures:
- the temperature to which the external stop-tap will tend between use water use events,
- the temperature of the water in the water main; and
- the temperature of the surroundings of the communication pipe and stop-tap Methods to assess the temperature of the water in the main and the temperature of the communication pipe and stop-tap have already been described above.

If there is no continuous flow from the water main along the communication pipe and through the external stop-tap, then the temperature of the external stop-tap will tend towards that of its surroundings in the chamber. Conversely if there is a continuous water flow from the mains through the external stop-tap, then its temperature will tend towards a point between the mains water temperature and the temperature the external stop-tap would have in the absence of water flow through it. That temperature will depend on the water flow rate in a predictable way. Hence knowing (or estimating) the three temperatures, the length of communication pipe and the thermal characteristics of the communication pipe, external stop-tap, mains water, service pipe and stop-tap surroundings and their geometries, the continuous water flow rate through the external stop-tap can be estimated.

The temperature to which the external stop-tap will tend between use water use events can be measured or estimated by:

1. determining the external stop-tap temperature at a time after a peak in temperature that is long enough for the external stop-tap temperature to have returned close to the longer-term temperature trend
2. theoretical calculation of the shape of peaks in temperature in response to water use events together with the measured shape of the peaks in external stop-tap temperature, to extrapolate the temperature that would occur at a very long time after each temperature peak if no other water use events were to occur
3. calculating a statistical measure of the extreme values (upper and lower) of measured stop-tap temperature, such as 2% ile and 98% ile of the temperatures in a six hour period centred on the time step for each site in the group. Other measures of extreme values could be used, such as other percentiles, or maximum and minimum values or by interpolating from extreme values measured at other time steps. It is then decided which extreme temperature (upper or lower) to use as the estimate of the temperature that the stop-tap will tend to between intermittent use events. Several methods to identify this are possible. For example the extreme value (upper or lower) that is closest to the central-tendency of the values (such as the median value of the temperatures in a six hour period centred on the time step) is likely to be a good estimate of the temperature that the stop-tap will tend to between intermittent use events. Other methods could match the characteristic shape of peaks in temperature in response to intermittent use to the time series of measured stop-tap temperatures: if the matched temperature peaks were inverted (i.e. the temperature decreased in response to intermittent use) then the upper extreme value should be selected, otherwise the lower extreme value should be selected.
4. Use of the measured external stop-tap temperature with the known or estimated mains-water and surroundings' temperatures to calculate the ratio of stop tap temperature minus surroundings' temperature to mains water temperature minus surrounds' temperature for each time step in the data. The time series of this ratio can then be used to assess the value of this ratio that would be tended to at a long time after an intermittent water use event.

The flow rate of continuous flows through the stop tap can be assessed as follows:
1. At each time step and for each external stop-tap calculate the ratio (R) of the difference between $T_{st}$ (the temperature that the stop-tap will trend towards between intermittent use events) and $T_s$ (the temperature of the communication pipe and stop-tap surroundings) as a proportion of the difference between the mains water temperature ($T_w$) and $T_s$:

$$R = \frac{(T_{st} - T_s)}{(T_w - T_s)}$$

2. Calculate the continuous flow rate through the stop tap from $$q = \frac{-2\pi . K_m . l}{C_p . \rho . \ln(R) \ln\left(\frac{4Z}{d}\right)}$$

Where:
q=continuous flow rate (m³/s)
Km=effective thermal conductivity of the surroundings of the communication pipe. This parameter can be assessed from actual temperatures as a function of measured flow rates, measured from samples of material or estimated from published typical values for soil thermal conductivity.
l=length of communication pipe from the point where it leaves the main (or the point where the water temperature (Tw) is measured) to the point where the stop-tap temperature (Tst) is measured
Cp=Specific heat capacity of water
z=Depth of burial of the communication pipe.
d=internal diameter of the communication pipe
ρ=density of water Fifth Class of Analysis Method Approaches Data analysis methods using temperature between water use events relative to the temperature of nearby external stop-taps to identify individual stop-taps with continuous flow through them may use or be based on the following. Methods to determine the temperature that an external stop-tap will tend to between water use event are described above. This will provide one or more values for the temperature (or a transform of it) that the stop-tap will tend to between use events. This might be a single value for the whole period of data collection, a value for every point in the original time series temperature data or a few values spread through the original time series data.

Outliers in the stop-tap temperature, or transformed stop-temperature, between water use events are identified. In the following "temperature values" means either actual temperature or transformed temperature.

Outliers in stop-tap temperature values between intermittent water use events are likely to be due to continuous flow through those stop-taps. Outliers can be identified by:
1. statistical tests of the distributions of temperature values for each stop-tap to identify stop-taps where the apparent probability of the temperature values being part of the whole population of temperatures values from all of the stop-taps is less than a defined value. A suitable statistical test includes, for example, the Student t test.
2. The difference between the central tendency of temperature values from a stop tap and the central tendency of the temperature values of the remaining stop-taps being greater than a difference previously calculated to indicate a continuous flow rate greater than a minimum value of interest.

These analyses can be made on the whole data set or sets with matched times or for between certain times of day.

The validity of the outliers as indicators of continuous flow past them, and the estimated size of the continuous flow past a stop-tap, can be checked by one or more of the following:
1. calculating the continuous flow from the temperature values (knowing or estimating the communication pipe and stop-tap surrounding's temperature, mains water temperature and the other thermal and physical characteristics of the communication pipe and stop taps)
2. The difference between the central tendency of temperature values from a stop tap and the central tendency of the temperature values of the remaining stop-taps being similar to the size (and sign) of peaks in the measured temperature (or transform) when a flow of similar size to that suspected to be continuous is induced through one of the stop-taps that doesn't have continuous flow.
3. Shutting off the stop-tap with suspected continuous flow and monitoring the stop-tap temperature to see whether it tends towards that of other stop-taps between use events.

Other possible data analysis methods to identify anomalous water usage at a site are outlined in the following table:

| Data | Prior knowledge or assumptions | To identify | Method |
|---|---|---|---|
| Logged outside stop-tap temperature for individual customer | A minimum difference between temperature of water in the main and temperature of the surroundings of the service pipe which is always the same | Continuous water flow past the stop-tap | The standard deviation in stop-tap temperature is less than a certain proportion (estimated at 10%) of the known minimum difference |

-continued

| Data | Prior knowledge or assumptions | To identify | Method |
|---|---|---|---|
| | sign. The property is occupied. Communication pipe length at least 25 cm. | | between mains-water and service-pipe surroundings' temperature. |
| Logged outside stop-tap temperature for individual customer | The property is occupied. Communication pipe length at least 25 cm. | Continuous water flow past the stop-tap | The standard-deviation of stop-tap temperature during the night-time (mid-night to 6am) is more than a certain proportion (estimated at 50%) of the standard deviation of the stop-tap temperature during the rest of the day. |
| Logged outside stop-tap temperature for an individual customer during individual use events, such as toilet flushes | A minimum difference between temperature of water in the main and temperature of the surroundings of the service pipe which is always the same sign. The property is occupied. Communication pipe length at least 25 cm. | Continuous water flow past the stop-tap | The range of temperature during the use event (from its start to 40 minutes after it sending) is less than a certain proportion (estimated at 10%) of the known minimum difference between mains-water and service-pipe surroundings' temperature. |
| Logged outside stop-tap temperature for a group of similar properties fed from the same part of the distribution system | A minimum difference between temperature of water in the main and temperature of the surroundings of the service pipe which is always the same sign. The properties are occupied. Communication pipe length at least 25 cm | Continuous water flow past the stop-tap | The standard deviation of the stop-tap temperature of the individual property is less than a certain proportion (estimated at 20%) of the median standard deviation in the stop-tap temperatures of the other members of the group |
| Logged outside stop-tap temperature for individual customer filtered to remove components of the signal with a period greater than 20 hours | A difference between temperature of water in the main and temperature of the surroundings of the service pipe. The property is occupied. Communication pipe length at least 25 cm. | Continuous water flow past the stop-tap | The standard deviation in stop-tap temperature is less than a certain proportion (estimated at 10%) of the known minimum difference between mains-water and service-pipe surroundings' temperature. |
| Logged outside stop-tap temperature for an individual customer that does not show peaks in temperature that would be expected from use events | Soil temperature exhibits a diurnal variation. Water temperature does not. | Differentiate between unoccupied properties and properties with continuous water flow | If the logged stop-tap temperature shows a diurnal variation (a frequency transform of the data will show a peak around 24 hours) this indicates that the property is unoccupied. |
| Logged outside stop-tap temperature for individual customer filtered to remove components of the signal with a period greater than 20 hours | The property is occupied. Communication pipe length at least 25 cm. | Continuous water flow past the stop-tap | The standard-deviation of stop-tap temperature during the night-time (mid-night to 6 am) is more than a certain proportion (estimated at 50%) of the standard deviation of the stop-tap temperature during the rest of the day. |
| Logged outside stop-tap temperature for a group of similar properties fed from the same part of the distribution system filtered to remove components of the signal with a period greater than 20 hours | A difference between temperature of water in the main and temperature of the surroundings of the service pipe. The properties are occupied. Communication pipe length at least 25 cm | Continuous water flow past the stop-tap | The standard deviation of the stop-tap temperature of the individual property is less than a certain proportion (estimated at 20%) of the median standard deviation of the group of similar properties |
| Logged outside stop-tap temperature for a group of similar properties fed from the same part of the distribution system | A difference between temperature of water in the main and temperature of the surroundings of the service pipe and always the same sign. Communication pipe length at least 25 cm | Continuous water flow past the stop-tap | The median temperature of the property with continuous flow differs from the median of the median temperatures of all the properties by greater than a certain proportion (estimated at 50%) of the estimated difference between water temperature in the main and temperature of the surroundings of the service pipe. |

| Data | Prior knowledge or assumptions | To identify | Method |
| --- | --- | --- | --- |
| Logged outside stop-tap temperature for a group of similar properties fed from the same part of the distribution system | A diurnal variation in stop-tap surrounding temperature but not in water temperature in the mains. Communication pipe lengths at least 25 cm. Occupancies less than 6. | Continuous water flow past the stop-tap | Assess the diurnal component of the stop-tap temperature for each property in the group. This can be done by frequency analysis or by using the skewness of the distribution of logged temperatures for each rolling 6 hour period for each property(If the median of the distribution is less than the mean then a low percentile (estimated as 5% ile) temperature for the 6 hours round that time step can be used as the estimated diurnal component: if the median is greater than the mean for that time step then a high percentile (estimated at 95% ile) temperature for the 6 hour time period around the time step can be used as the estimated diurnal component). Properties with continuous flow can be identified as those where the standard deviation in the diurnal component is less than a certain proportion (estimated at 10%) of the median standard deviation of the diurnal components for all the properties in the group. |

An example data analysis method of classifying or determining the state of a site based on percentiles will now be described. This method uses temperature data logged at 30 second intervals over a period of between 2 and 7 days. The same method will work for shorter logging intervals and logging intervals up to 10 minutes. The method assumes a single communication pipe, known soil temperature, mains water temperature, and average soil thermal conductivity. The logged external stop-tap temperature is denoted $T_{st}$, the water temperature in the main is denoted $T_w$, the soil temperature at the external stop-tap depth is denoted $T_s$, and the horizontal distance between the water main and external stop tap is normally between 0.3 and 2 meters.

At each logging time step the ratio (R) of the difference between $T_{st}$ and $T_s$ as a proportion of the difference between $T_w$ and the $T_s$ is calculated $$R = \frac{(T_{st} - T_s)}{(T_w - T_s)}$$

Figure 11:
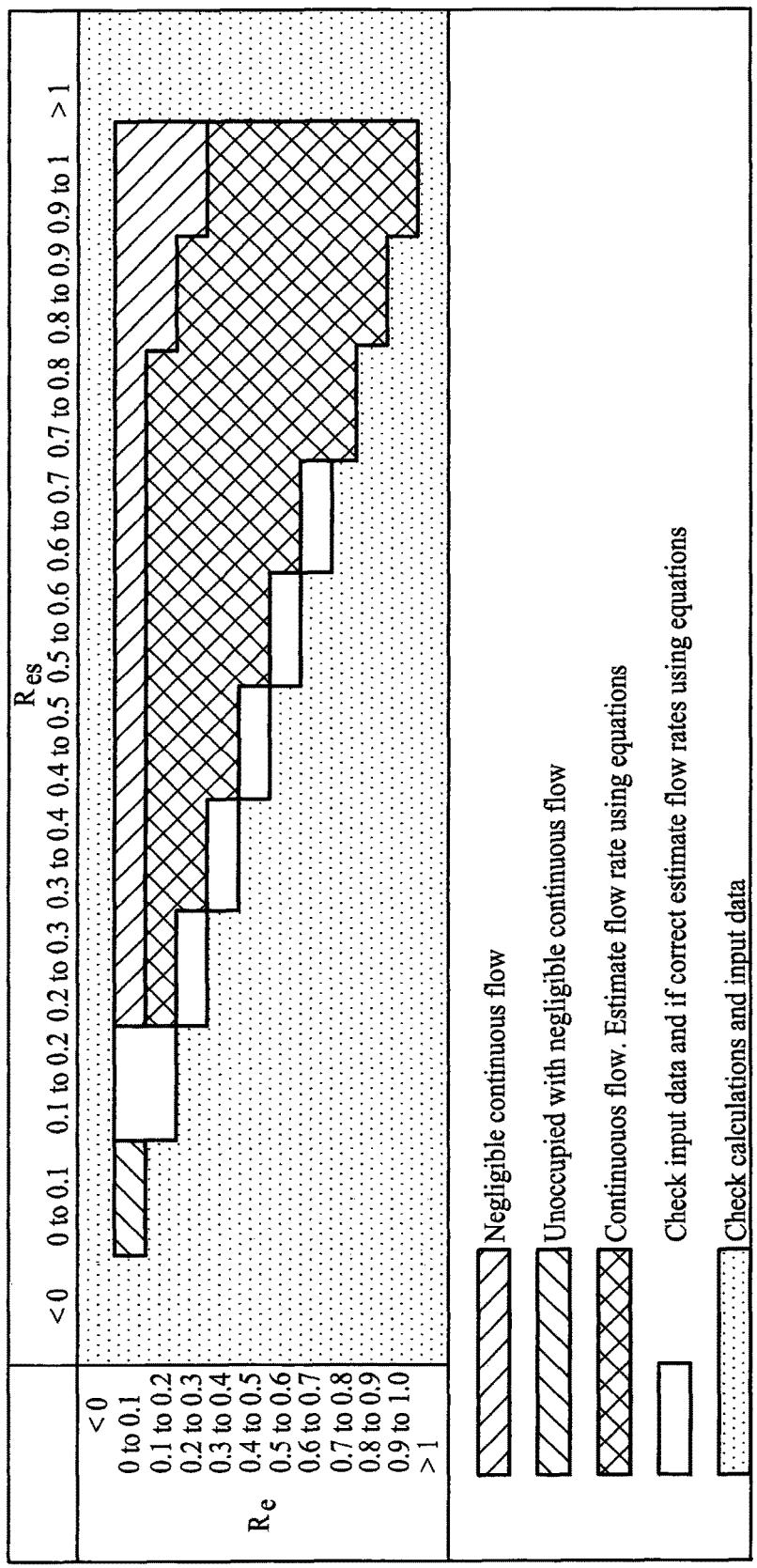
FIG. 11 shows a table showing the identified state of a site as a function of percentiles of temperature ratios which may be implemented in a data analysis method.

Any zero or negative values for R are removed. The 95% ile value for R is calculated for the whole logging period (i.e. the value which 95% of the individual R values are below) and is denoted $R_{95}$. The 5% ile value for R is calculated (i.e. the value which 5% of the individual R values are below) and is denoted $R_5$. Then the values of $R_{95}$ and $R_5$ for the site are compared against the values set out in the table illustrated in FIG. 11 to identify or classify the state of the site as being one of: unoccupied with negligible continuous flow; negligible continuous flow; continuous flow; or check data.

The actual flow rate of the continuous flow can also be calculated using the continuous flow rate equation for q above and using $R_5$ for R.

Continuous flows of more than 5 litres per hour are likely to indicate a significant fault in the plumbing or water using devices within a site (such as a continuously running toilet overflow) or a small leak on the underground supply pipe. Much higher continuous flows of more than 50 litres per hour are more likely to be due to underground supply pipe leaks rather than faults in water using devices.

Simpler data analysis approaches can also be used as well as more quantitative and more complex ones.

A first simple approach is as follows. Temperatures are recorded at the stop-tap at 30 second intervals for a period of preferably 48 hours at two or more sites. The standard deviation in the temperature is calculated for each site. The median standard deviation is calculated for all the sites (or for all sites where the continuous flow is thought to be zero). A ratio of standard deviation at the site to the median standard deviation for all sites is selected or set that indicates a continuous flow of interest. The ratio of standard deviation to median standard deviation is calculated for all sites. Sites where the ratio of standard deviation to median standard deviation is below the expected ratio for the minimum continuous flow of interest are identified.

For example, consider the five sites (462, 464, 466, 468 and 470), each logged for a 48 hour period. The standard deviations in measured temperature from the 48 hours of temperature flow data are:

| Site | Standard deviation (° C.) |
| --- | --- |
| 462 | 1.21 |
| 464 | 1.10 |
| 466 | 1.31 |
| 468 | 0.82 |
| 470 | 0.22 |

The median standard deviation for all five sites is 1.10° C. In this example the minimum continuous flow rate of interest ($q_{min}$) is 10 litres per hour and the expected ratio ($r_{min}$) of the standard deviation for this continuous flow rate to the standard deviation for zero continuous flow is calculated from the equation:

$$r_{min} = 1 - e^{\left[\frac{-2\pi K_m l}{C_p \rho \cdot \ln\left(\frac{4Z}{d}\right) q_{min}}\right]}$$

Where:
$q_{min}$=minimum continuous flow rate of interest past the external stop-tap (10 l/hr=2.778·10$^{-6}$ m$^3$/s in this case)
$K_m$=effective thermal conductivity of the surroundings of the communication pipe and stop-tap. This parameter can be assessed from actual temperatures as a function of measured flow rates, measured from samples of material or estimated from published typical values for soil thermal conductivity (=0.9 W/mK).
l=length of each communication pipe from the point where it leaves the main to the point where the stop-tap temperature is measured (4 metres)
$C_p$=Specific heat capacity of water
z=Depth of burial of the service pipes (0.75 metres).
d=internal diameter of the communication pipes (0.015 metres)
ρ=density of water (1000 kg/m$^3$)
$r_{min}$=The expected ratio of the standard deviation for the continuous flow rate
($q_{min}$) to the standard deviation for zero continuous flow
The expected ratio of the standard deviation for the continuous flow rate ($q_{min}$) to the standard deviation for zero continuous flow ($r_{min}$) is then calculated to be 0.30.
The ratio of standard deviation to median standard deviation for all sites is given in the table below.

| Site | Standard deviation (° C.) | Ratio of standard deviation to median standard deviation |
|---|---|---|
| 462 | 1.21 | 1.10 |
| 464 | 1.10 | 1.00 |
| 466 | 1.31 | 1.19 |
| 468 | 0.82 | 0.75 |
| 470 | 0.22 | 0.20 |

The only site where the ratio of standard deviation to median standard deviation is below the expected ratio for the minimum continuous flow of interest is site 470. The ratio of standard deviation to median standard deviation at this site is 0.20. This is below the expected ratio for the minimum continuous flow of interest (i.e. 0.30) and so this indicates that the continuous flow rate at this site is greater than 10 litres/hour.

This approach is particularly effective if: the variation in the temperature of the water in the mains (Tw) and the temperature of the surroundings to the communication pipe and stop tap (Ts) during the logging period is less than 20% of the difference between them (or the data is processed to remove variations in the measured temperature with period greater than 6 hours); and there is data from more than one site and those sites are connected to the same main and have similar stop-taps and communication pipe lengths and similar temperature of the surroundings to the communication pipe and stop-tap and are occupied.

A second simple approach is as follows. The temperature at each stop-tap is measured at 30 second intervals for a period of preferably 48 hours at two or more sites. The median temperature of each of the sites is calculated to provide one value for each site. The median of the median temperatures of all of the sites is calculated to provide one value. The mean temperature of all the sites is calculated to provide one value. The standard deviation in temperature of each of the sites is calculated to provide one value for each site. The median of the standard deviations is calculated to provide one value. Each site is identified for which the median temperature for the site is between 1.5 and 5.0 median standard deviations (of all the sites) from the median temperature and the difference between the median temperature of that site and the median temperature of all the sites is greater than the difference between the median temperature of that site and the mean temperature of all sites. These sites are likely to have continuous flow past the stop tap.

For example, consider the five sites 462, 464, 466, 468 and 470, which are each logged for a 48 hour period at 30 second intervals. The table below shows the median and mean temperatures and their standard deviations for all the sites, calculated from the 48 hour temperatures.

| Site | Median measured stop-tap temperature over the logging period (° C.) | Mean measured stop-tap temperature over the logging period (° C.) | Standard deviation in measured stop-tap temperature over the logging period (° C.) | Difference between median stop-tap temperature and median for all sites (° C.) | No. of median standard deviations between median value and for this site and median value for all sites |
|---|---|---|---|---|---|
| 462 | 9 | 9.4 | 1.21 | −0.6 | −0.5 |
| 464 | 9.4 | 9.7 | 1.10 | −0.2 | −0.2 |
| 466 | 9.6 | 9.8 | 1.31 | 0.0 | 0.0 |
| 468 | 10.2 | 10.4 | 0.82 | 0.6 | 0.5 |
| 470 | 12.3 | 12.4 | 0.22 | 2.7 | 2.5 |
| Mean | | 10.2 | | | |
| Median | 9.6 | | 1.10 | | |

Of all five sites only site 470 has a difference between its median temperature and the median temperature of all the sites greater than 1.5 median standard deviations. This identifies the site has having continuous flow past the stop-tap.

This approach is particularly effective if: the variation in the temperature of the water in the mains (Tw) and the temperature of the surroundings to the communication pipe and stop tap (Ts) during the logging period is less than 20% of the difference between them; and there is data from more than one site and those sites are connected to the same main and have similar stop-taps and communication pipe lengths and similar temperature of the surroundings to the communication pipe and stop-tap.

Figure 12:
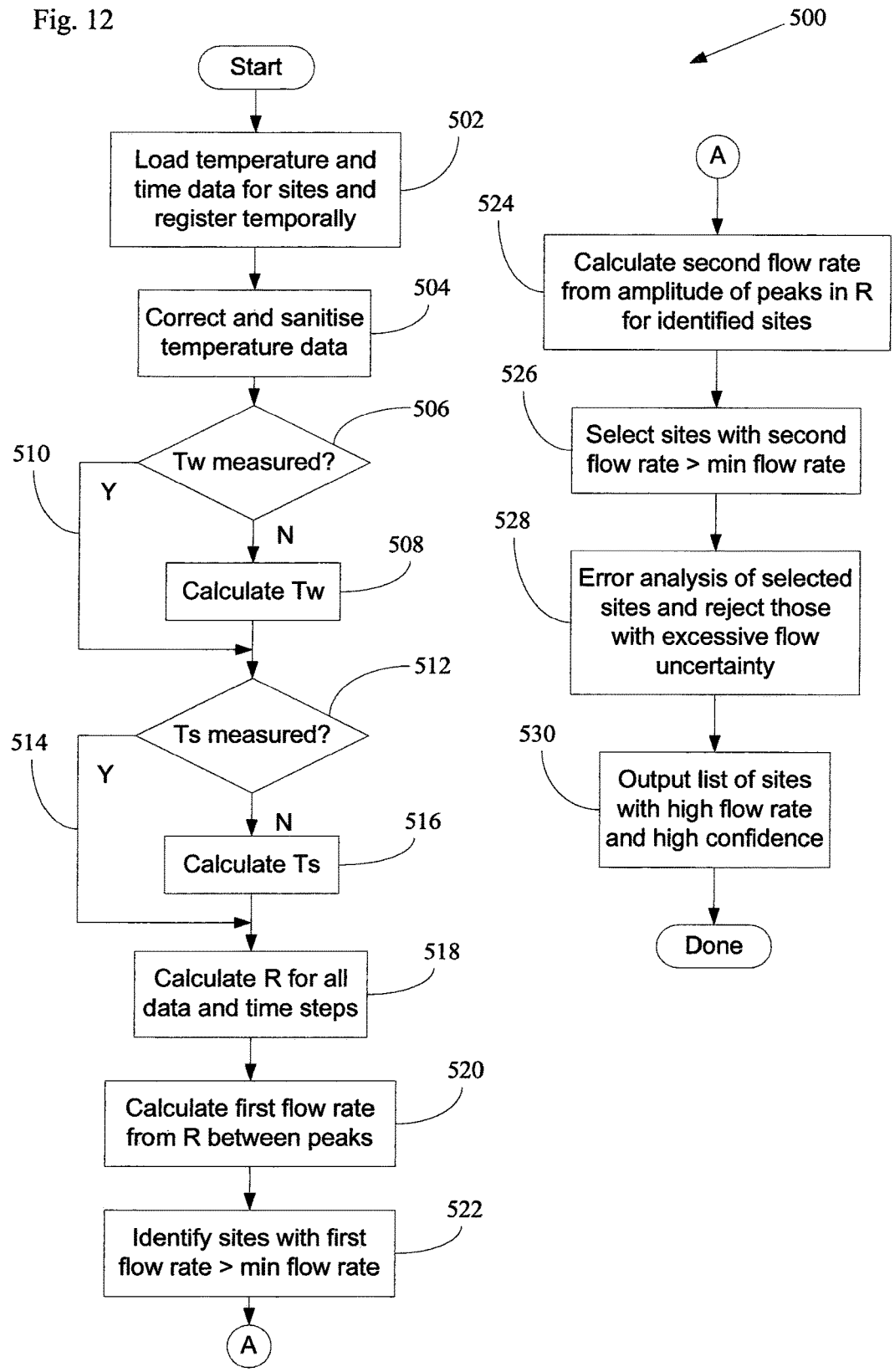
FIG. 12 shows a flow chart illustrating the operation of software to analyse temperature data to identify continuous flows.

FIG. 12 shows a flow chart illustrating the operation of software to analyse temperature and flow data to identify continuous flows.

Different approaches can be used as a cross check on the validity of their answers. Both approaches can be used and then a set of sites are selected for which the calculated continuous flow is above a minimum flow rate of interest, such as 2 litres/minute, for both approaches. A quantitative uncertainty calculation is carried out for both methods combined for each site in that selected set using the estimated error range in all the inputs and combining them. Any sites where the probability of continuous flow being below the minimum flow rate of interest is greater than a certain value, such as 25%, are rejected.

FIG. 12 shows a process flow chart illustrating a first computer implemented data analysis method 500 which may be implemented in suitable software and carried out by the temperature logger or data analysis computer for different embodiments of the invention.

The method 500 begins by loading the logged temperature and time data at 502, for example from a database, for a plurality of different sites. These sites will usually have similar temperatures of the surroundings to the stop-tap and communication pipe, similar temperature of water in the mains to which they are connected and similar thermal properties of the material (usually soil) surrounding the communication pipe and stop-tap. These similarities will usually be because the sites are geographically close to each other and connected to the same water main. The temperature data has been collected over the same time period at all of the sites.

The temperature and time data for the different sites are then temporally aligned or registered so that the temperature data for the different sites all have a common time. At 504 the temperature data can be calibrated. This is carried out by comparing recorded temperatures from all of the loggers at a time when all the loggers' sensors experienced the same temperature, such as when they are stored together before deployment in conditions that allow them to achieve thermal equilibrium with each other. One sensor is selected to act as the standard value. The recorded temperatures for each other sensor for all the time steps are adjusted by a constant amount (different for each sensor) so that during the period when the sensors experience the same temperature the average (adjusted) recorded temperature for each sensor for that period are equal to the average of the recorded temperature of the sensor selected as the standard value during the period. This reduces the probability of sites being erroneously identified as having continuous flows past the stop-tap and improves the accuracy of calculated continuous flow rates Any apparently erroneous data can also be removed in a data sanitising process at 504, for example by inspecting and manually deleting any apparently erroneous data.

At 506 it is determined if the mains water temperature Tw was measured or determined for the sites of interest. If not then processing proceeds to 508 at which a value for Tw is calculated using any of the methods described above for estimating Tw. Otherwise processing proceeds 510 to 512 at which it is determined if the temperature of the surroundings Ts of the stop-tap was measured or determined for the sites of interest. If not then processing proceeds to 516 at which a value for Ts is calculated using any of the methods described above for estimating Tw. Otherwise processing proceeds 514 to 518.

At 518, the ratio R, as defined above, is calculated for each temperature step and for each site, and the set of R values for each site is stored, for example in a database. Then at 520 a first method is used to calculate the flow rate for each site. For each site, R values corresponding to times between peaks in temperature are identified and a continuous flow rate is calculated, as described above, for each site. Then at 522 those sites for which the calculated continuous flow rate is greater than a first threshold value, for example 2 litres/minute, are added to a first list of sites which appear to have a continuous flow rate greater than the first threshold value and therefore may be sites exhibiting anomalous water usage.

Then at 524, for those sites in the first list, the continuous flow rates are calculated again using a second different method. In particular, the flow rate is calculate using the amplitude of the peaks in R values for each site. Then at 526, those sites having a flow rate greater than the same threshold rate (in this example 2 litres/minute) are selected, either by modifying the first list or creating a second list of sites. Hence, the selected sites each have a flow rate which has been determined to be greater than a threshold value calculated in two different ways, to help remove any false positives.

Then at 528, for each selected site an error analysis method is applied to the results. The flow rates at each of the selected sites are re-calculated using Monte-Carlo analysis for both methods at the same time taking account of the distribution of estimated errors in the input values and the independence or dependence of the various input values. This produces a probability distribution of flow rates for each selected site. For those sites where the probability of the flow rate being less than the threshold flow rate is more than a threshold probability (for example 25%) the site is removed from the list of selected sites. Then at 530, the results are output and may be in the form of the list of selected sites which have been identified as having a high flow rate and with a reasonable or high level of confidence.

The measured and collected temperature data can also be used for related or similar purposes. For example, it can be expensive and/or inconvenient to install customer water meters and many customers do not wish to be charged on their metered consumption. Customers who do not pay a volumetric charge for their water (sometimes referred to as "unmeasured customers") may act differently in their water using habits to those that are metered. In addition many metered customers are provided with meters that only provide total volume of water passing through the meter between two reading dates.

It is often useful for water undertakings to have detailed information on their customers' water use behaviour. Some water companies use data from small area monitors each consisting of a meter through which a group of typically 50 to 100 properties are fed. However, analysis of data from these meters requires a number of assumptions about the behaviour of the individual customers, and the occupancy numbers of the properties supplied, in order to extrapolate the results. If the actual behaviour of individual customers could be sampled cost-effectively, then the water consumption patterns could be understood better, and this may inform water companies in making decisions.

The methods described below could be used to provide data to help water companies, and other organisations, to:

1) Interpret the flows into small area consumption monitor flows to understand individual customer consumption patterns;

2) Account for variations in district and zonal flows over the course of a day, a week, and a year;

3) Develop seasonal night use and daily consumption allowances, especially for unmeasured household properties;

4) Determine whether there is intermittent water use in a property, and hence whether it is occupied;

5) Estimate the average occupancy rate of a property over a period of time;

6) Detect continuous flow events which could be due to use, waste, or leakage;

7) Determine whether the use of water is direct from the mains or whether it is via storage within the property;

8) Cost-effectively extend the number of customers whose consumption patterns may be sampled for consumption monitoring purposes; or 9) Identify which customers are supplied via which boundary box.

The second data processing method described below may provide the number of intermittent use events over a time period. Again, the time period may be greatly variable and may be between one hour and one year in duration. Preferable time periods include one hour, six hours, twenty four hours or 7 days. The time of day during which the time period occurs may vary. For example, the preferable time of day for a one hour time period, or a 6 hour time period, is between midnight and 6 am.

The second data processing or analysis method is based on identifying peaks, or troughs, in the recorded temperature data, or from a processed value of the recorded temperature data, which may be supplemented with additional data or assumptions.

In a simplest approach, peaks or troughs in the recorded temperature data, or processed recorded temperature data, may be identified from individual data points with values higher than their neighbours.

Generally speaking, the recorded temperature data may be processed in the following way. The recorded temperature data may be frequency filtered to remove higher frequency and lower frequency components which are unlikely to correspond to individual water use events. For example, a rolling average may be determined over a suitable short averaging period. The short averaging period is selected to suppress peaks shorter than the minimum length of a peak that could be due to an intermittent flow. A rolling average over a suitable long averaging period may also be determined and subtracted from the recorded temperature data. The long averaging period is selected so that the subtraction removes long-period variations that are not due to intermittent flow. The temperature data is differentiated to produce peaks in the processed temperature data corresponding to the point of maximum rate of change of temperature.

The number of peaks may then be counted to give an initial estimate of the number of intermittent use events in a time period. The initial estimate of the number of intermittent use events may be improved by making an allowance for intermittent use events that are hidden by other intermittent or continuous flow events. This improvement may be made by estimating the time during which other events may be hidden and multiplying the initial estimate by the ratio of the total time period to the time period minus the time when events may be hidden. This improvement may also be made by using detailed records of the actual times of intermittent use recorded in a sample of consumers' properties and identifying the proportion of actual use events that are seen in the temperature record or processed temperature record. The initial estimate of use events may be divided by this proportion to obtain a better estimate of the number of intermittent use events.

The total volume of water due to intermittent use events may be calculated from the product of the number of intermittent use events and the average volume passing the stop-tap for each use event.

The average volume passing the stop-tap for each intermittent use event may be calculated from known typical volumes used in each type of intermittent use event (such as toilet flushing, washing machine operation, bath filling, hand washing, showers etc.) along with known typical proportions of occurrence of each type of intermittent use event.

The average volume passing the stop tap for each intermittent use event may also be calculated by comparing metered consumption by a sample of customers to the number of intermittent use events recorded from temperature measurement at the stop tap at the same time.

Figure 13:
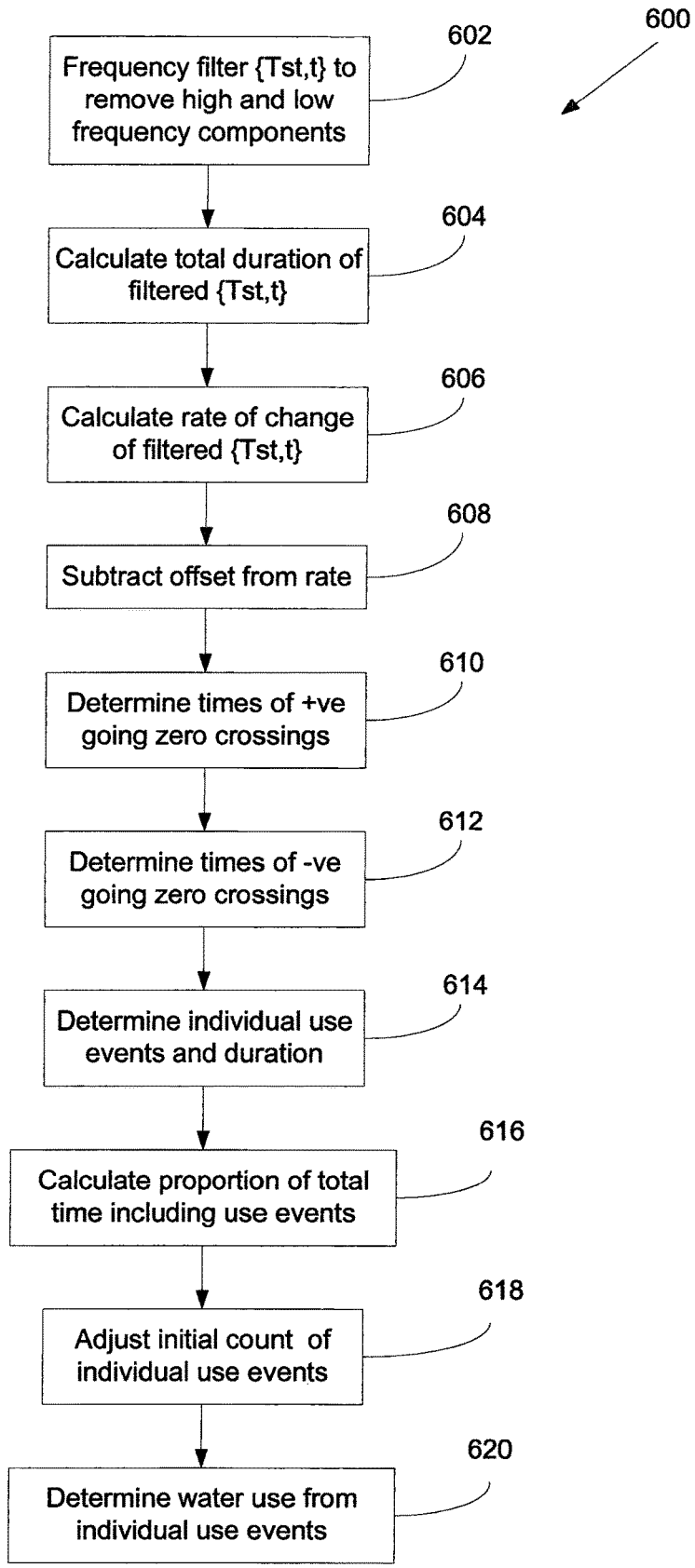
FIG. 13 shows a further flow chart illustrating a second method of operation of software to analyse the temperature data.

FIG. 13 shows a process flow chart illustrating a second computer implemented data analysis method 600 which may be implemented by suitable software and carried out by the temperature logger or data analysis computer for different embodiments of the invention. The main results obtained by the second method include the number of individual water use events and the calculated time of each water use event.

Figure 14:
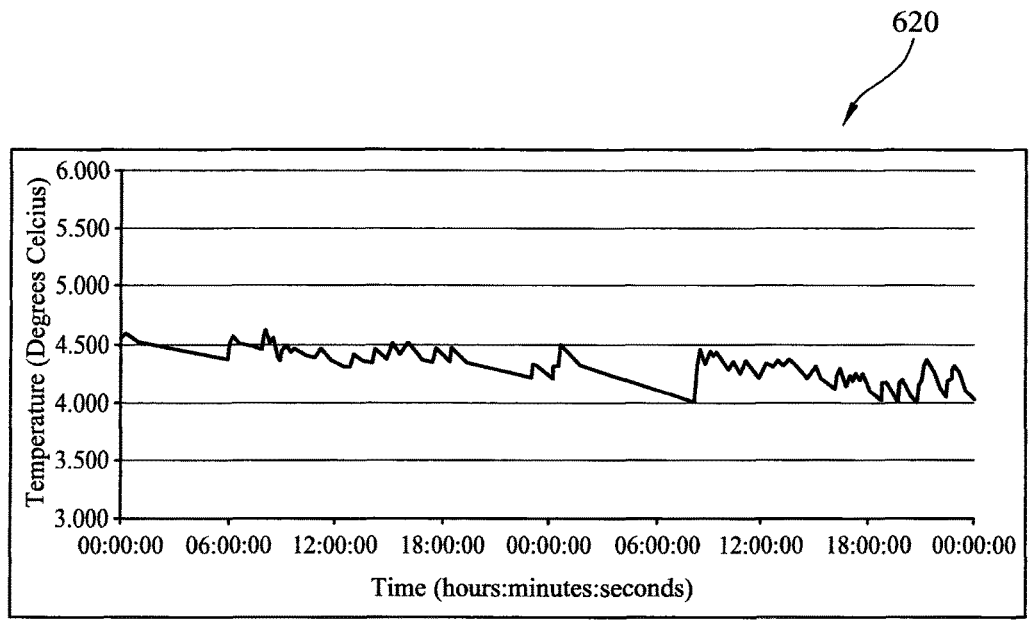
FIGS. 14 to 17 show respective graphs of various data items as a function of time at various stages of the second method illustrated in FIG. 13.

The second data analysis method 600 uses the recorded stop tap temperature, Tst, as a function of time, t. The set of time series stop tap temperature data {Tst, t}, is stored in a storage device or memory 601 and analysed by method 600. FIG. 14 shows a plot 620 of the recorded stop tap temperature, Tst, in degrees centigrade, as a function of time for a 48 hour period, i.e. over two days.

At 602, the time series stop tamp temperature data {Tst, t} is filtered to remove high frequency components and low frequency components, which are unlikely to correspond to water use events. A rolling average of the time series stop tap temperature data is determined over a shorter averaging period, for example of two minutes. The shorter averaging period is selected to suppress peaks shorter than the minimum length of a peak that could be due to an intermittent flow, for example two minutes. A rolling average over a longer averaging period is determined and subtracted from the recorded temperature data. A suitable longer averaging period is, for example six hours. The long averaging period is selected so that the subtraction removes long-period variations that are not due to intermittent flow.

Figure 15:
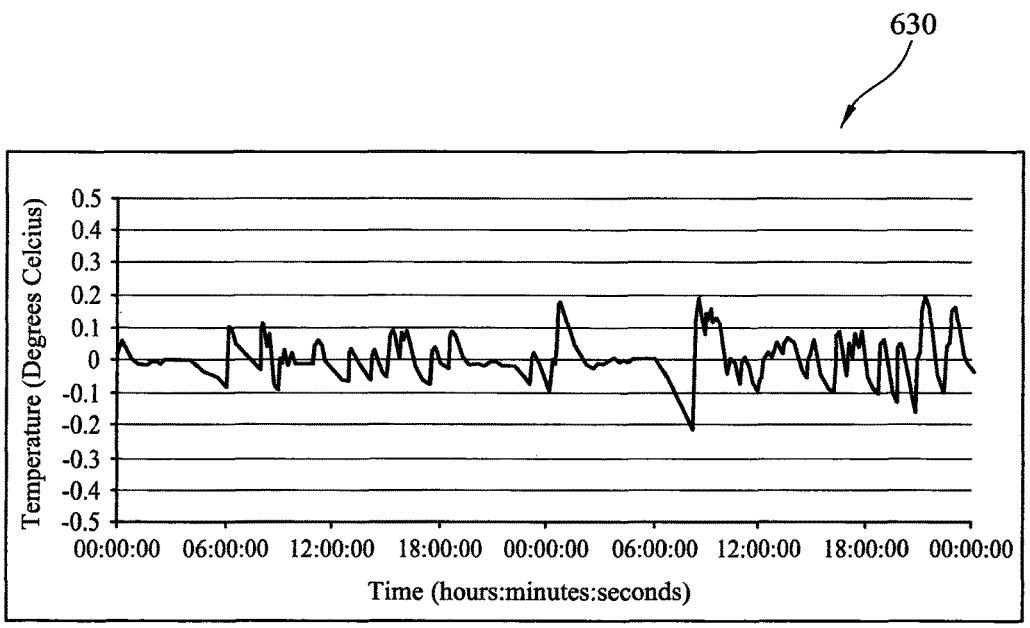

FIG. 15 shows a plot 630 of the frequency filtered stop tap temperature data as a function of time over the same 48 hour period in degrees centigrade.

At 604, the total duration of the frequency filtered stop tap temperature time series data is calculated, in suitable units, for example minutes.

Figure 16:
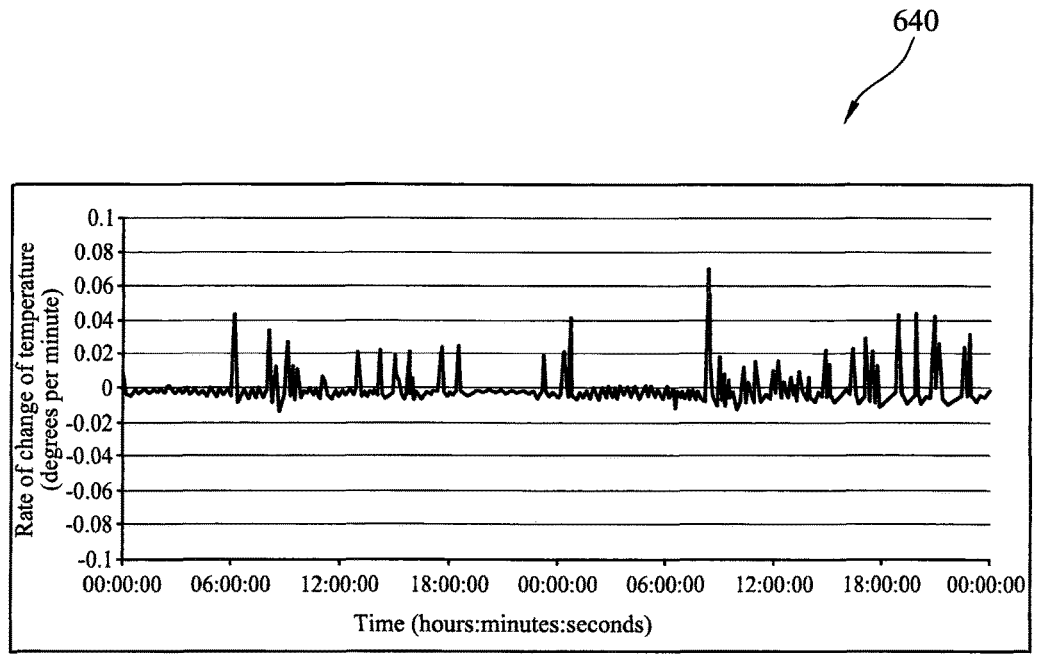

At 606 the rate of change of the filtered stop tap temperature data is calculated, i.e. dTst/dt, and the rate of change data is stored. This produces peaks in the processed data at the times of maximum rate of change of temperature. FIG. 16 shows a plot 640 of the rate of change of the frequency filtered stop tap temperature data (in degrees centigrade per minute) as a function of time over the same 48 hour period.

An offset or adjustment value is then calculated. The adjustment or offset value is calculated by carrying out the process shown in FIG. 13 up to and including step 606 for a group of, for example, ten temperature records from ten different stop taps that are similar in design, depth, time of year and length of communication pipe to the stop tap for which the time series of interest was recorded. This produces a set of ten time series of rates of change of frequency filtered stop tap temperatures. For each of these ten time series the portions of the data between 3 am and 4 am are selected for each day in the time series. If there are ten time series, each 28 days in length there will be 280 portions between 3 am and 4 am. The adjustment or offset value is set at a value such that less than 10% of these portions have a maximum value (of the filtered rate of change of temperature) greater than the adjustment or offset value.

Figure 17:
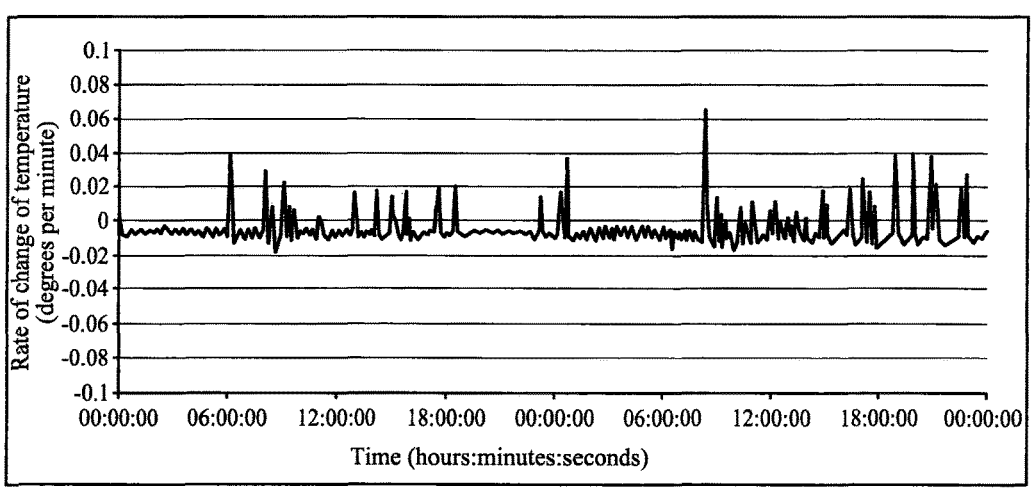

At 608, the offset value is subtracted from the rate of change data and the adjusted rate of change data is stored. Subtraction of the offset value results in there being no time periods during which use events are known not to have occurred having an adjusted rate of change value greater than zero. FIG. 17 shows a plot 650 of the offset subtracted rate of change data as a function of time over the same 48 hour period.

At 610, the time of each crossing of the zero value of the offset subtracted rate of change data, from a negative value to a positive value (corresponding to a positive going crossing of the zero value of the axis of FIG. 17) is identified and the times stored as a time ordered list. These times correspond to the start times of water use events. At 612, the time of each crossing of the zero value of the offset subtracted rate of change data, from a positive value to a negative value (corresponding to a negative going crossing of the zero value of the axis of FIG. 17) is identified and the times stored as a time ordered list. These times correspond to the end times of water use events.

Hence, each water use event is identified by a start time and a stop time from the time ordered lists. At 614 the start time and stop time data is processed to identify the individual use events and the duration of each use event. For example, a first water use event corresponds to the first start time and the first stop time and its duration is the difference between the first stop time and the first start time. A second water use event corresponds to the second start time and the second stop time and its duration is the difference between the second stop time and the second start time, etc. The start and stop time data is processed and an initial value for the total number of water use events is determined, together with their associated durations. The total duration of water use events is also calculated by summing the individual use event durations and stored.

At 616, the proportion of the total duration of the recorded time series data, in this example 48 hours, which corresponds to water use events is calculated. A percentage value can be obtained by simply dividing the total duration of water use events, determined at 614, by the total duration of the recorded time series data, determined at 604, and multiplying by one hundred.

Then at 618, the initial count of total water use events can be adjusted to provide a final count of water use events. This may be done to take into account the possibility of overlapping water use events which have not given rise to separate distinguishable peaks in the rate data.

For example, the number of peaks in the adjusted rate of change of temperature above zero data illustrated in FIG. 17 is fifty, over the 48 hour period. If those fifty peaks have a median duration of 5 minutes and an average duration of 5 minutes and 30 seconds, then the total duration, during which other overlapping use events are unlikely to result in distinguishable peaks in the data is 50×5 minutes 30 seconds=4 hours and 35 minutes in the 48 hours. This is 9.5% of the total time. Therefore it can be estimated that a further 4.5 water use events are likely to have occurred (being 9.5% of 50 peaks) without being detected in the data. This can be rounded up or down to an integer value of water use events, for example rounded up to five unresolved water use events. Hence, at 618 the initial count of water use events, 50, can be corrected by an additional five, to arrive at a final estimate of the number of water use events of 55 over the 48 hour period.

Finally, at 620 the amount of water use may optionally be determined, based on the number of individual water use events.

The total volume of water may be calculated from the product of the number of individual water use events and an average volume of water passing the stop-tap for each water use event. For typical UK patterns of water consumption, the average volume of water per use event is about 9.8 litres of 0.0098 m$^3$.

The third data processing method described below may provide the total intermittent flow through the internal and/or external stop-tap, communication pipe, or pipe within a premises over a time period. This time period is greatly variable and may be, for example, between one hour and one year in duration. The method seems to work particularly well for a time period of over 24 hours. The main results obtained by the third method include estimated water flow rates as a function of time.

It will be appreciated that the same general method can also be applied with suitable modifications when the relative temperatures are such that water use events result in troughs in the temperature data.

Figure 18:
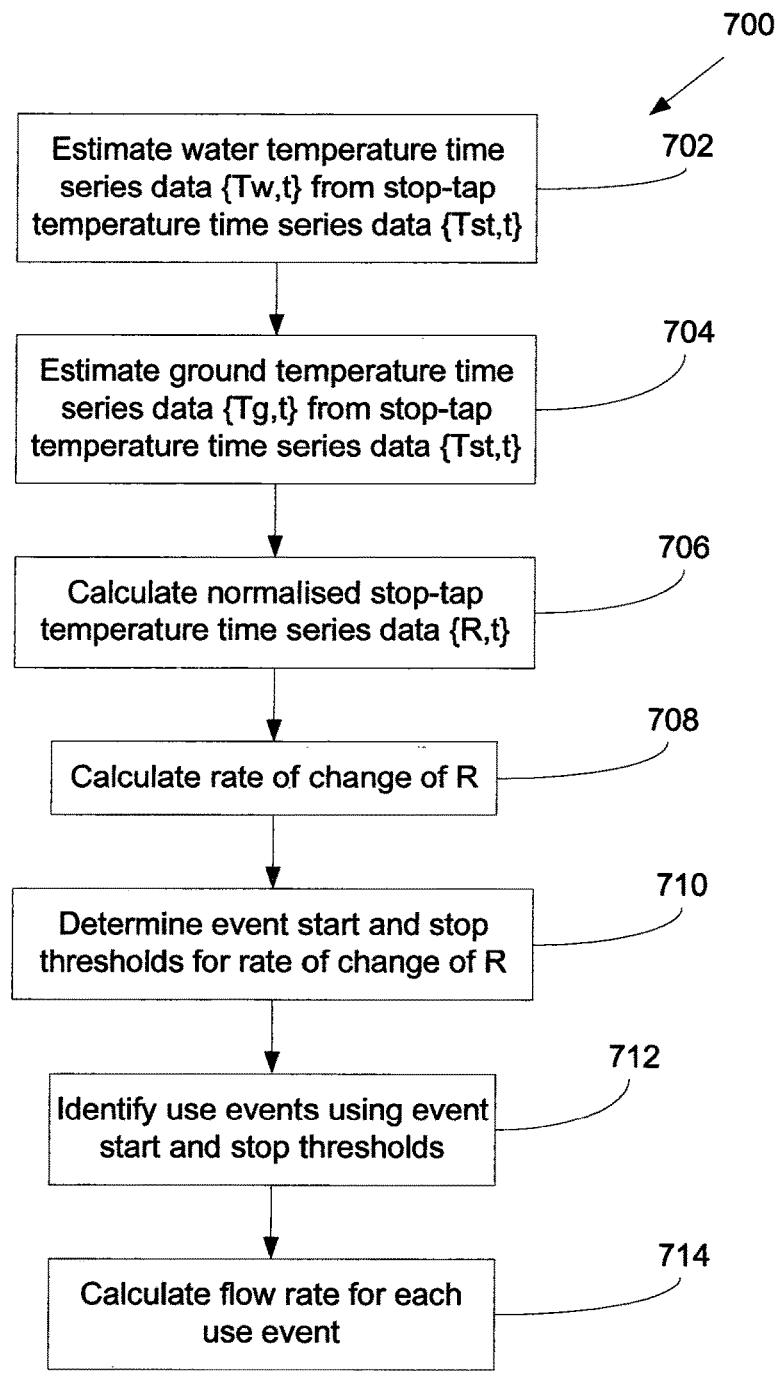
FIG. 18 shows a yet further process flow chart illustrating a third method of operation of software to analyse the temperature data.

FIG. 18 shows a process flow chart illustrating a third computer implemented data analysis method 700 which may be implemented by suitable software and carried out by the temperature logger or data analysis computer for different embodiments of the invention.

At 702 the set of measured stop tap temperature time series data {Tst, t} is processed to obtain an estimate of the corresponding water temperature, Tw, time series data, {Tw, t}. Any of the method discussed above for estimating the water temperature, Tw, from the measured stop tap temperature, Tst, may be used. The set of estimated water temperature time series data {Tw, t} is then stored.

At 704, the set of measured stop tap temperature time series data {Tst, t} is processed to obtain an estimate of the corresponding ground temperature, Tg, time series data, {Tg, t}. the ground temperature, Tg, is the temperature to which the stop-tap would return between use events. Tg may be estimated by one or more or of low frequency filtering, averaging over periods of several hours and selecting percentile values of Ts.

For example, the ground temperature (Tg) may be calculated by determining whether the stop-tap temperature is above or below the estimated water temperature (resulting from 702). If the stop tap temperature is above the water temperature then the 98% ile temperature over a 6 hour window centred on each time step is calculated. A time step of between 1 minute and 1 second may be used, for example 40 seconds. Otherwise the 2% ile temperature over a 6 hour window centred on each time step is calculated. The percentile value is averaged over a 12 hour period centred on each time step of, for example, 40 seconds. This averaged value provides the estimated ground temperature, in this example. These averaging procedures effectively carry out a low frequency filtering of the stop tap temperature. The set of estimated ground temperature time series data {Tg, t} is then stored.

Figure 19:
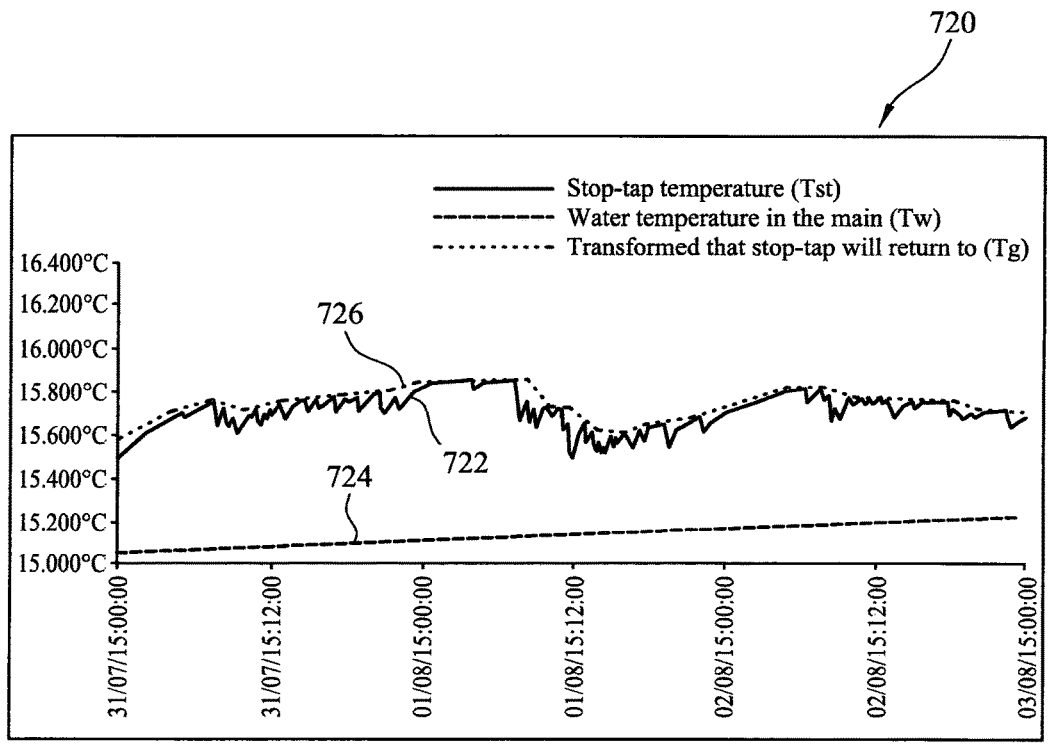
FIGS. 19 to 22 show respective graphs of various data items as a function of time at various stages of the third method illustrated in FIG. 18

FIG. 19 shows a graph 720 of temperature in degrees centigrade against time for a three day, or 72 hour, period and including three plots. A first solid line 722 is a plot of the measured stop tap temperature, Tst, as a function of time. A second dashed line 724 is a plot of the estimated temperature of the water in the main, Tw, as a function of temperature obtained form 702. A third dotted line 726 is a plot of the estimated ground temperature, Tg, that the stop-tap would return to between use events, from the low frequency filtering of the stop tap temperature, Ts, as described in the preceding paragraph.

Figure 20:
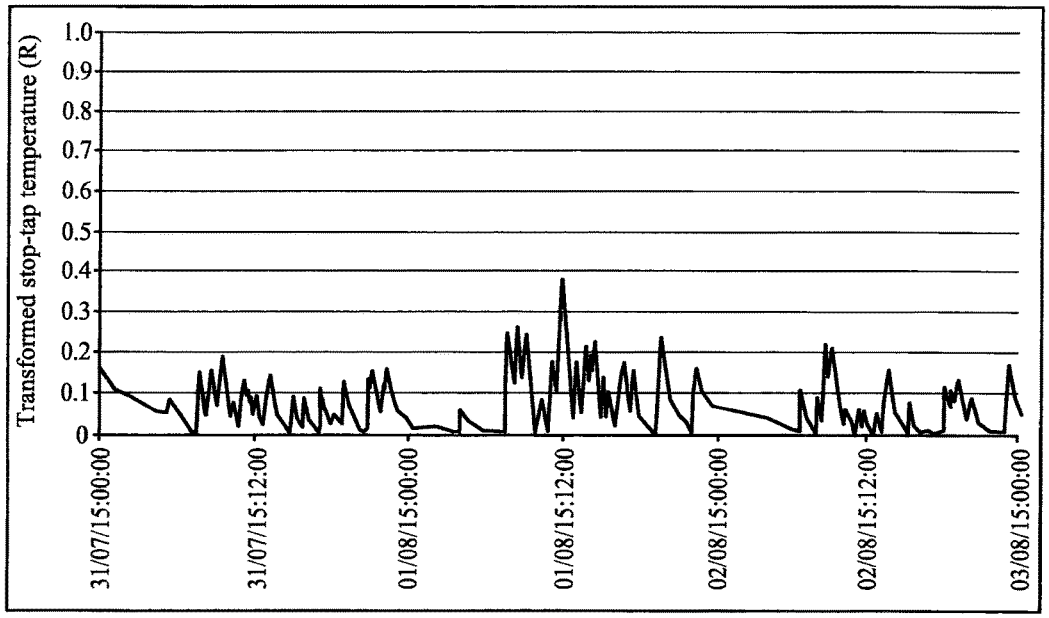

At 706 a set of normalised stop tap temperature values are calculated and a set of normalised stop tap temperature time series data, {R, t} is stored. The normalised stop tap temperature may be calculated using the expression:

$$R = \frac{(T_{st} - T_g)}{(T_w - T_g)}$$

Where Tst is the stop tap temperature, Tw is the estimated water temperature from step 702 and Tg is the estimated ground temperature from 704. FIG. 20 shows a graph 730 of the normalised stop tap temperature, R, against time for the same three day period as FIG. 19.

At 708 the rate of change of the normalised stop tap temperature, R, is calculated for each time step. The rate of change of R with time is calculated for each time step by calculating the change in R between a previous time point and a next time point, for each time point in the time series data, and dividing by twice the time step (in seconds), i.e.:

$$R_t \approx \frac{(R_{t+\delta t} - R_{t-\delta t})}{2 \cdot \delta t}$$

Figure 21:
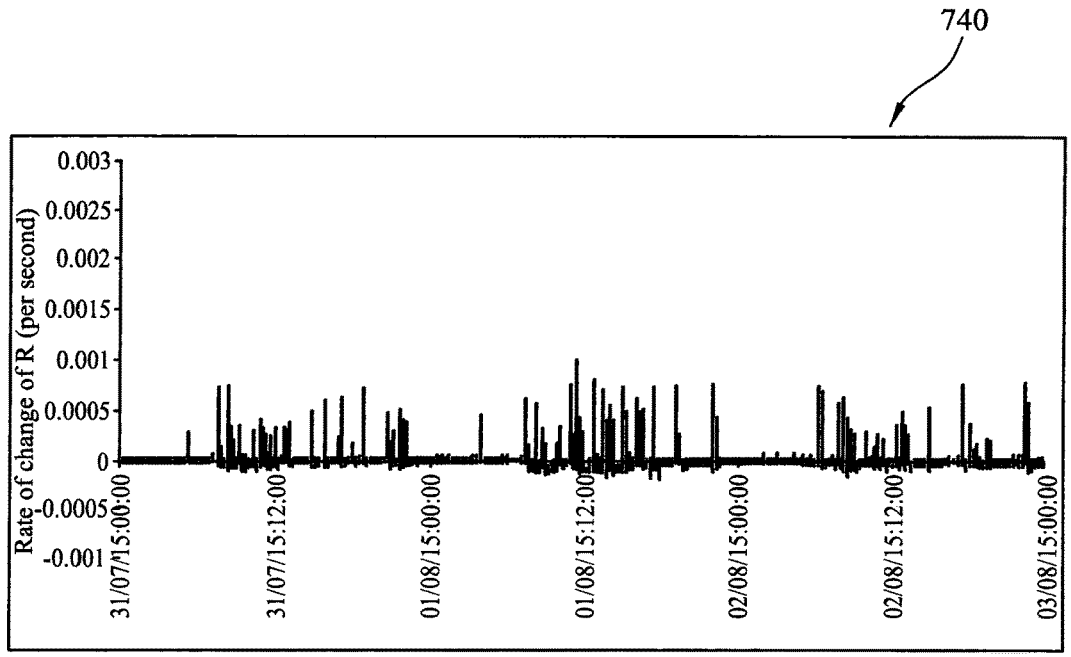

FIG. 21 shows a graph 740 of the rate of change of R with time, against time for the same three day period as FIGS. 19 and 20.

Water use events are identified by using an event start threshold value of rate of change of R and an event stop threshold value of rate of change of R. The event start threshold is a minimum rate of change of R, so that a change from less than, to more than, the limit marks the start of a use event. The event stop threshold is a second rate of change of R, where a reduction of the rate of change of R to below that value marks the end of the water use event. The stop threshold value is less than the start threshold value. The start and stop threshold rate of change values can be determined by measuring the temperature change due to a known use event and adjusting the start and stop values so that noise in the temperature signal which is not related to use events is rejected, but the changes in temperature that correspond to the use events are not rejected. The calculated end of the use event corresponds to the actual end of the use event plus two minutes. In this example, the water use event start threshold value of the rate of change of R (to identify the start of a peak in the rate of change of R) is set at 0.0001 s$^{-1}$ and the water use event stop threshold value for the rate of change of R (to identify the end of the peak in the rate of change of R) is set at 0.00001 s$^{-1}$.

At 712 the water use event start threshold value and the water use event stop threshold value are retrieved from memory and at 716, the event start and stop threshold values are used to identify water individual use events by identifying peaks in the rate of change of R time series data. More specifically, the start of each peak in the rate of change of R is identified as the time when the rate of change of R exceeds 0.0001 s$^{-1}$ and the end of each peak in the rate of change of R is identified as the time when the rate of change of R falls below 0.00001 s$^{-1}$. The start and stop times for each water use event are stored and each consecutive pair of start and stop time data items identifies, and corresponds to, a respective water use event.

At 718, the flow rate for each water use event is calculated. In particular, the flow rate for each time step within the start and stop times of a water use event is calculated and then average over the duration of the water use event. The average flow rate for each use event is then stored in association with the time of each water use event.

The flow rate (q) past the stop tap corresponding to each water use event can be estimated using the following system of equations:

$$q = \frac{A}{-\ln\left(\frac{dR}{dt}\frac{1}{C} + R_0\right)} \text{ where}$$

$$A = \frac{2\pi \alpha l}{\ln\left(\frac{4Z}{d}\right)}$$

$$C = \frac{2e^{\left(\frac{B^2}{t^2}\right)}B}{\pi t^2}$$

$$B = \frac{x^2}{4\alpha} \text{ and}$$

α=effective thermal permissivity of the surroundings to the communication pipe and stop-tap. This parameter can be assessed from actual temperatures as a function of measured flow rates, measured from samples of material or estimated from published typical values for soil thermal permissivity.

l=length of communication pipe from the point where it leaves the main (or the point where the water temperature (Tw) is measured) to the point where the stop-tap temperature (Tst) is measured.

z=Depth of burial of the communication pipe.

d=internal diameter of the communication pipe x=effective distance from the water in the service pipe to the measurement point R$_0$=the value of the normalised temperature (R) at the start of the peak in the temperature.

The following corrections are made at 718 when calculating the average flow rates. The calculated flow rate at the first time step is set to zero. A minimum acceptable rate of change of R peak duration is set to 2 minutes. The flow rate for any rate of change of R peaks with a duration of less than 2 minutes is set to zero. The duration of each water use event is shortened by 2 minutes. And, for each water use event, the calculated flow rate at each time step of a water use event is averaged over the water use event.

Figure 22:
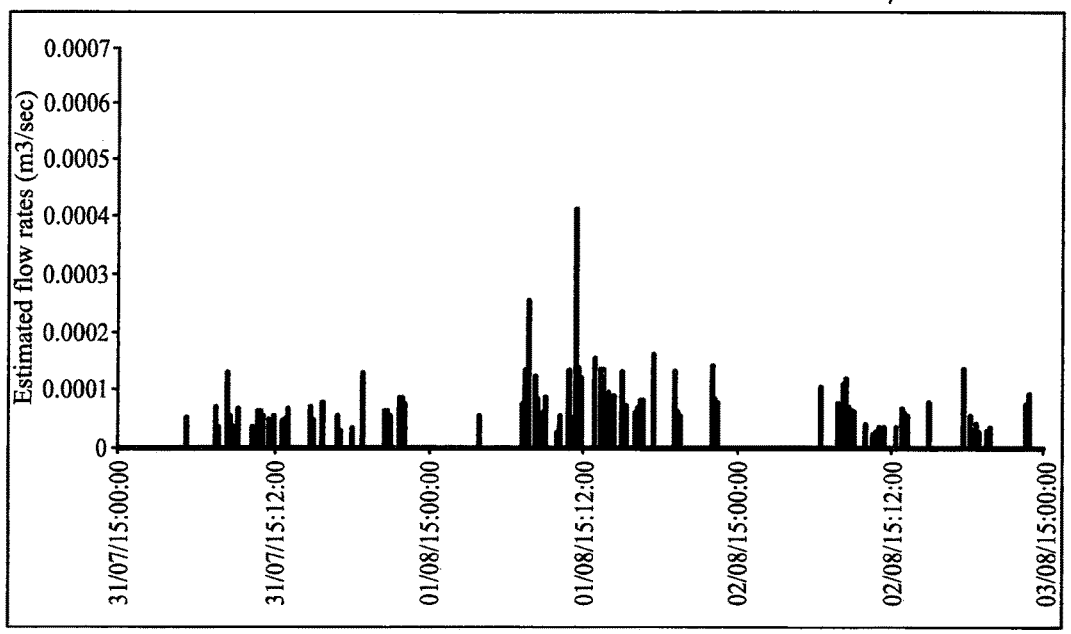

This produces estimated average water flow rates in $m^3 s^{-1}$ for a set of water use events at different times as illustrated by the graph 750 shown in FIG. 22.

Various modifications, changes and adaptions of the invention will be apparent to a person of ordinary skill in the art in view of the description of the invention provided above.

The invention claimed is:

1. A method of determining water consumption at a site, comprising:
   recording a temperature of a part of a water supply system between a water main and a site as a function of time;
   analysing the recorded temperature as a function of time to determine a property indicative of the water consumption at the site; and
   recording the temperature of respective parts of the water supply system between a water main and a plurality of sites as a function of time and wherein the site is a one of the plurality of sites.

2. The method of claim 1, wherein the property indicates whether the water consumption at the site is anomalous.

3. The method of claim 1, wherein the property is indicative of a continuous flow of water at the site.

4. The method of claim 3, wherein the property is an estimate of the rate of flow of water at the site.

5. The method of claim 1, and further comprising using the property to classify the site as likely having a water leak or not having a water leak.

6. The method of claim 1, the property is associated with one or more peaks or troughs in the recorded temperature.

7. The method of claim 1, wherein the property is associated with the recorded temperature between any peaks or troughs in the recorded temperature.

8. The method of claim 1, further comprising analysing the recorded temperature as a function of time to determine a plurality of properties indicative of the water consumption at the site.

9. The method of claim 8, wherein a first property is associated with one or more peaks or troughs in the recorded temperature and/or a second property is associated with the recorded temperature between any peaks or troughs in the recorded temperature.

10. The method of claim 1, and further comprising analysing the recorded temperature as a function of time for each of the others of the plurality of sites, not including the site, to determine a further property for each of the others of the plurality of sites.

11. The method of claim 10, further comprising using the property of the site and further property of the other sites to classify the site as likely having a water leak or not having a water leak.

12. The method of claim 1, wherein the property is individual water use events corresponding to individual water use events at the site.

13. The method of claim 12, wherein analysing the recorded temperature as a function of time includes:
   determining a rate of change of the recorded temperature or a normalised value of the recorded temperature.

14. The method of claim 1, wherein the or each part of the water supply system is located in an external chamber.

15. The method of claim 1, wherein the or each part of the water supply system is located in a building.

16. The method of claim 1, wherein the or each part is a valve or a pipe, or a part of a pipe, in thermal communication with a valve.

17. The method of claim 16, wherein the valve a stop tap.

18. The method of claim any of claim 1, and further comprising:
   recording a temperature of an environment in thermal communication with the part of a water supply system between a water main and a site as a function of time.

19. The method of claim 18, and further comprising:
   analysing the recorded temperature of the environment as a function of time to determine a property of the environment.

20. The method of claim 19, and further comprising:
   also using the property of the environment to classify the site as likely having a leak or not having a leak.

21. The method of claim 1, wherein the temperature of the part of the water supply system is recorded for more than twelve hours.

22. The method of claim 21, wherein the temperature of the part of the water supply system is recorded for between one and seven days.

23. The method of claim 1, wherein the or each site is, or includes, a domestic dwelling.

24. The method of claim 23, wherein the domestic dwelling is a house.

25. The method of claim 1, and further comprising:
   transmitting the recorded temperature as a function of time to a computer and wherein the computer carries out the analysis.

26. The method of claim 25, wherein the recorded temperature is wirelessly transmitted to the computer.

27. The method of claim 1, and further comprising:
   wirelessly transmitting a message including one or more results of the analysis to a remote computer over a communications network.

28. A method of determining water consumption at a site, comprising:
   recording a temperature of a part of a water supply system between a water main and a site as a function of time; and
   analysing the recorded temperature as a function of time to determine a property indicative of the water consumption at the site,
   wherein the property is individual water use events corresponding to individual water use events at the site, and
   wherein analysing the recorded temperature as a function of time includes:
      determining a rate of change of the recorded temperature or a normalised value of the recorded temperature;
      identifying peaks in the rate of change to identify individual water use events; and
   wherein analysing the recorded temperature as a function of time includes:
      making an initial determination of the total number of water use events during a period of time; and
      adjusting the initial determination of the total number of water use events to arrive at a final total number of water use events, based on the duration of the water use events as a proportion of the period of time.

29. A method of determining water consumption at a site, comprising:
   recording a temperature of a part of a water supply system between a water main and a site as a function of time; and
   analysing the recorded temperature as a function of time to determine a property indicative of the water consumption at the site, wherein the property is individual water use events corresponding to individual water use events at the site, and wherein analysing the recorded temperature as a function of time includes calculating the average flow rate for each individual water use event.

30. A method of determining water consumption at a site, comprising:

recording a temperature of a part of a water supply system between a water main and a site as a function of time; and analysing the recorded temperature as a function of time to determine a property indicative of the water consumption at the site; and recording a temperature of an environment in thermal communication with the part of a water supply system between a water main and the site as a function of time, wherein the environment is the ground adjacent the part of the water supply system.

31. A water consumption surveying method comprising:

installing respective temperature logging devices to log measured temperature of respective parts of a water supply system between a water main and respective sites for each of a plurality of sites;

recording the temperature as a function of time of the respective parts of the water supply system using the temperature logging devices; and analysing the recorded temperature as a function of time for the plurality of sites to determine whether any of the plurality of sites is likely to have a water leak or to determine the number of individual water use events for each of the plurality of sites.

32. The method of claim 31, wherein the temperature logging devices are installed in respective external chambers each housing respective parts of the water supply system.

33. The method of claim 32, wherein the temperature logging devices are installed within respective buildings each including respective parts of the water supply system.

34. The water consumption surveying method of claim 31, further comprising:

transferring the recorded temperature as a function of time from the plurality of temperature logging devices to a separate computer and wherein the separate computer carries out the analysing.

35. The water consumption surveying method of claim 34, wherein the recorded temperature is transferred to the separate computer while the temperature logging devices are in situ.

36. The water consumption surveying method of claim 34, and further comprising:

removing the temperature logging devices from where it was installed before the recorded temperature is transferred to the separate computer.

37. The water consumption surveying method of claim 31, wherein the analysing is carried out by the temperature logging devices.

38. The water consumption surveying method of claim 37, and further comprising the temperature logging devices each transmitting a message including one or more results of their respective analysing to a remote computer.

* * * * *